United States Patent
Russell

(10) Patent No.: US 9,363,421 B1
(45) Date of Patent: Jun. 7, 2016

(54) CORRECTING FOR ARTIFACTS IN AN ENCODER AND DECODER

(71) Applicant: GOOGLE INC., Mountain View, CA (US)

(72) Inventor: Andrew Ian Russell, San Jose, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/594,489

(22) Filed: Jan. 12, 2015

(51) Int. Cl.
*G06K 9/36* (2006.01)
*H04N 1/64* (2006.01)
*G06T 9/00* (2006.01)

(52) U.S. Cl.
CPC ... *H04N 1/64* (2013.01); *G06T 9/00* (2013.01)

(58) Field of Classification Search
USPC .......... 382/166, 162, 152, 244, 287, 242; 1/1; 348/95, E9.01, E9.042; 345/49, 50
See application file for complete search history.

(56) References Cited

U.S. PATENT DOCUMENTS

| | | | |
|---|---|---|---|
| 4,982,270 A | 1/1991 | Tanaka et al. | |
| 6,291,311 B2 * | 9/2001 | Ohashi | 257/E21.552 |
| 6,782,135 B1 | 8/2004 | Viscito et al. | |
| 7,301,999 B2 | 11/2007 | Filippini et al. | |
| 7,480,417 B2 * | 1/2009 | Malvar | H04N 1/64 348/E9.01 |
| 7,756,348 B2 | 7/2010 | Mukherjee et al. | |
| 8,031,769 B2 | 10/2011 | Kuo | |
| 8,279,925 B2 | 10/2012 | Sathianathan et al. | |
| 9,131,192 B2 * | 9/2015 | Ubillos | G06F 3/04855 |
| 2012/0183045 A1 | 7/2012 | Kerofsky et al. | |

FOREIGN PATENT DOCUMENTS

| | | |
|---|---|---|
| WO | 2009158113 A2 | 12/2009 |
| WO | 2013087861 A2 | 6/2013 |
| WO | 2014149523 A1 | 9/2014 |

OTHER PUBLICATIONS

Bankoski, et al, "Technical Overview of VP8, An Open Source Video Codec for the Web", 2011 IEEE International Conference on Multimedia and Expo (ICME), Jul. 2011, 6 pages.
Grange, et al, "A VP9 Bitstream Overview", Network Working Group, Internet Draft, Feb. 18, 2013, 14 pages.
Sullivan, et al, "Recommended 8-Bit YUV Formats for Video Rendering (Windows)", retrieved on Feb. 6, 2014 from http://msdn.microsoft.com/de-de/library/windows/desktop/dd206750%28v=vs.85%29.aspx, Apr. 2002, 9 pages.
Tan, et al, "Intra Prediction by Averaged Template Matching Predictors", IEEE 2007, pp. 405-409.
Tan, et al, "Intra Prediction by Template Matching", ICIP 2006, pp. 1693-1696.

* cited by examiner

*Primary Examiner* — Anh Do
(74) *Attorney, Agent, or Firm* — Brake Hughes Bellermann LLP

(57) ABSTRACT

An apparatus (e.g., a computer device) includes an image coding system and/or an image decoding system. A method of decoding an encoded image includes positioning a first pixel and a second pixel at a midpoint of the first pixel and the second pixel, the midpoint being associated with two colors of a first color space, repositioning the first pixel to a first position, the first position being on a boundary of a second color space and having a value, in the second color space, corresponding to a third color of the first color space, and repositioning the second pixel to a second position, the second position being rotationally symmetric with the repositioned first pixel around the midpoint.

20 Claims, 16 Drawing Sheets

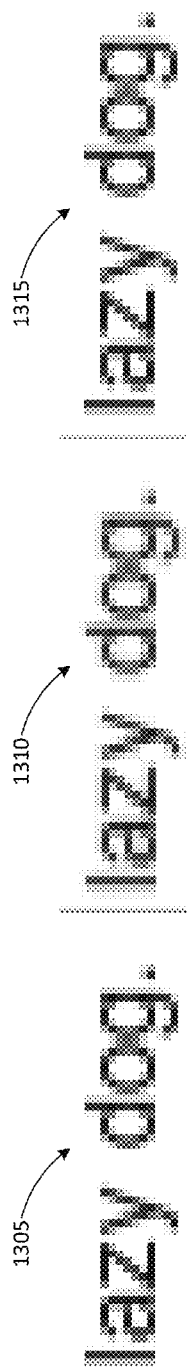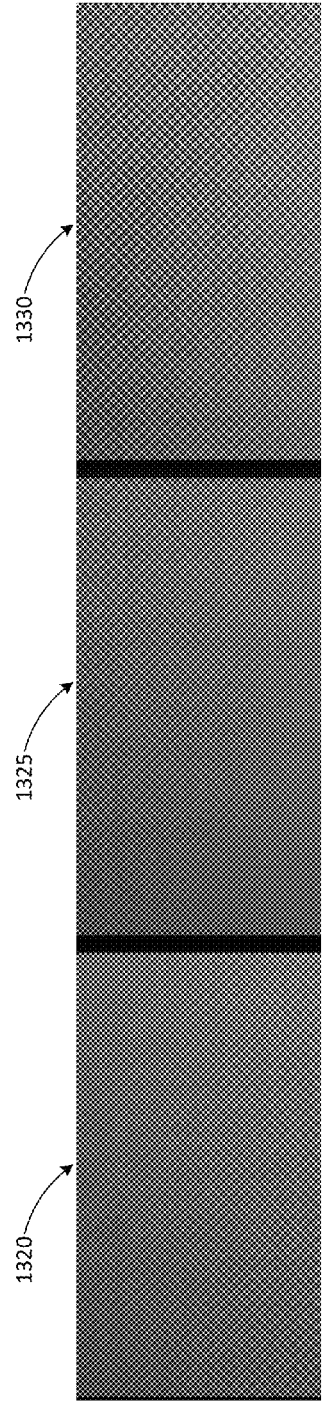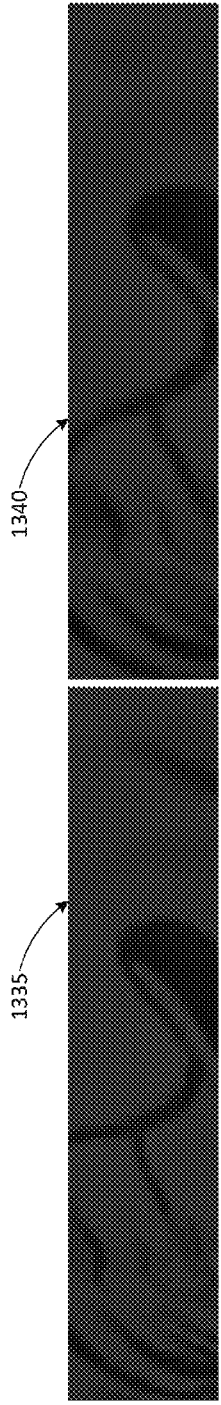
FIG. 13A
FIG. 13B
FIG. 13C

CORRECTING FOR ARTIFACTS IN AN ENCODER AND DECODER

BACKGROUND

Decoded images can be distorted due to algorithm used when encoding and/or decoding the image. For example, in conventional image encoding/decoding color artifacts or distortions can exist in a decoded image due to errors associated with decoder clipping, an encoder interpolation filter (e.g., blocking) and/or encoder gamma correction.

SUMMARY

This disclosure relates to encoding and decoding image data.

According to an example embodiment, a method of decoding an encoded image includes positioning a first pixel and a second pixel at a midpoint of the first pixel and the second pixel, the midpoint being associated with two colors of a first color space, repositioning the first pixel to a first position, the first position being on a boundary of a second color space and having a value, in the second color space, corresponding to a third color of the first color space, and repositioning the second pixel to a second position, the second position being rotationally symmetric with the repositioned first pixel around the midpoint.

According to another example embodiment, a decoder includes a corrected RGB module configured to position a first pixel and a second pixel at a midpoint of the first pixel and the second pixel, the midpoint being associated with two colors of a first color space, reposition the first pixel to a first position, the first position being on a boundary of a second color space and having a value, in the second color space, corresponding to a third color of the first color space; and reposition the second pixel to a second position, the second position being rotationally symmetric with the repositioned first pixel around the midpoint.

According to still another example embodiment, a method of decoding an encoded image includes receiving a first plurality of values associated with the encoded image, the first plurality of values are calculated as a linear average of values in a non-linear first color space calculated as a combination of values in a linear second color space, receiving a second plurality of values associated with the encoded image, receiving a third plurality of values associated with the encoded image, the second plurality of values and the third plurality of values correspond to values in the non-linear first color space that are based on a spatially averaged combination of pixels in the linear second color space, converting the first plurality of values to a fourth plurality of values in the non-linear first color space based on the first plurality of values, the second plurality of values and the third plurality of values, and generating a plurality of corrected pixels in the linear second color space based on the fourth plurality of values, the second plurality of values and the third plurality of values.

Implementations can include one or more of the following features. For example, the first color space can be a YUV color space and the second color space can be a RGB color space. The midpoint can correspond to an encoded pixel associated with the first pixel and the second pixel. For example, the repositioning of the first pixel can include determining a first maximum value that can be added to a value for a first color of the colors of the second color space, determining a second maximum value that can be added to a value for a second color of the colors of the second color space, determining a third maximum value that can be added to a value for a third color of the colors of the second color space, determining a first value, a second value and a third value based on the first maximum value, the second maximum value, the third maximum value and a boundary value of the second color space, and repositioning the first pixel by adding the first value, the second value and the third value to a respective value for each of the colors of the first pixel.

For example, the repositioning of the first pixel can include determining a first maximum value that can be added to a value for a first color of the colors of the second color space, determining a second maximum value that can be added to a value for a second color of the colors of the second color space, determining a third maximum value that can be added to a value for a third color of the colors of the second color space, setting a delta value to the smallest value of the first maximum value, the second maximum value, the third maximum value, first recalculating the delta value based on the middle value of the first maximum value, the second maximum value, the third maximum value and a boundary value of the second color space, second recalculating the delta value based on the largest value of the first maximum value, the second maximum value, the third maximum value and a boundary value of the second color space, and repositioning the first pixel by adding the delta value to a value of the first pixel. The method can further include generating an image based on a first plurality of pixels including the first pixel and the second pixel, generating a second plurality of pixels by shifting each of the first plurality of pixels diagonally by one pixel, generating a plurality of midpoint pixels based on adjacent pixels of the second plurality of pixels generating a third plurality of pixels including each of the third pixel and the fourth pixel associated with the plurality of midpoint pixels, and generating an image by pixel by pixel averaging first plurality of pixels and the third plurality of pixels. For each of the plurality of midpoint pixels, the method can further include positioning a third pixel and a fourth pixel at a corresponding midpoint pixel of the plurality of midpoint pixels, repositioning the third pixel to a third position, the third position being on a boundary of the second color space and having a value, in the second color space, corresponding to the third color of the first color space, and repositioning the fourth pixel to a fourth position, the fourth position being rotationally symmetric with the repositioned third pixel around the corresponding midpoint pixel.

For example, the encoded image can be one of received from a server including a first encoder, or received from a datastore including at least one image encoded by at least one second encoder. The method can further include generating a plurality of 2×2 blocks of pixels based on the encoded image, where each pixel of a 2×2 block of the plurality of 2×2 blocks of pixels is an averaged down sampled pixel, and the midpoint corresponds to a pixel of the 2×2 block.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein:

FIGS. 13A, 13B and 13C illustrate portions of images with at least one artifact and with a correction for the artifact based on the techniques described herein.

Figure 1A:
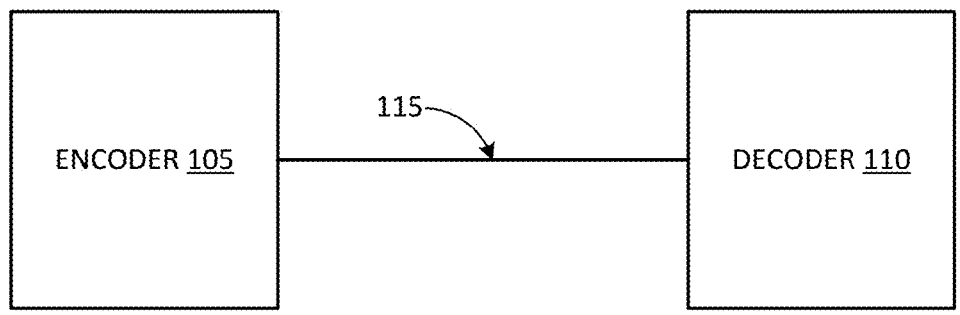
FIG. 1A illustrates a block diagram of a system including an encoder and a decoder according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims.

According to an example embodiment, a decoder can correct, reduce and/or eliminate (or substantially eliminate) a color artifact or distortion due to clipping of a pixel during a conversion of a pixel from a Luminance (or Luma)/Chrominance (YUV) color space to a Red/Green/Blue (RGB) color space.

Figure 1B:
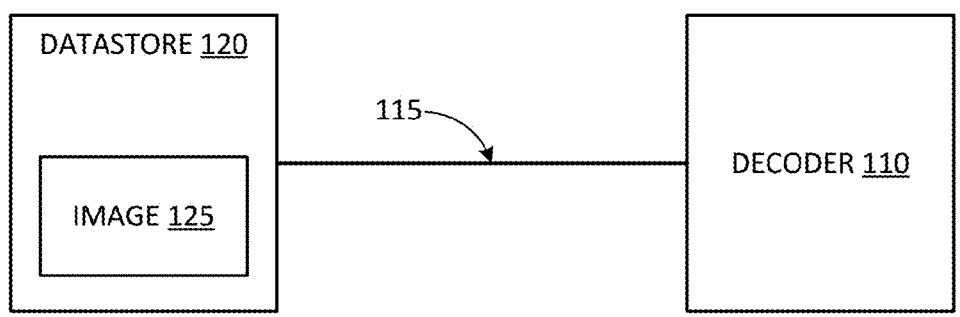
FIG. 1B illustrates a system including datastore including a previously encoded image and a decoder according to at least one example embodiment.

FIG. 1A illustrates a block diagram of a system including an encoder 105 and a decoder 110 according to at least one example embodiment. FIG. 1B illustrates a system including datastore 120 including a previously encoded image 125 and the decoder 110 according to at least one example embodiment. The encoder 105 and the decoder 110 may be embodied as a special purpose processor (e.g., a graphics processing unit (GPU) or visual processing unit (VPU)).

The encoder 105 and/or the decoder 110 may be embodied as code executed by at least one processor that can be configured to execute computer instructions associated with an image (or video) encoding/decoding system. The at least one processor may be a shared resource. For example, the encoder 105 and/or the decoder 110 may be an element of a larger system (e.g., a mobile device, a personal computer or a server). Therefore, the at least one processor may be configured to execute computer instructions associated with other elements (e.g., web browsing or wireless communication) within the larger system. The encoder 105 and/or the decoder 110 may include a microprocessor, a micro-controller, an application specific integrated circuit (ASIC), and the like. Data may be transmitted from the encoder 105 or the datastore 120 over link 115 that communicatively couples the encoder 105 and/or the decoder 110. The link 115 may be a wired or wireless link using, for example an internet, intranet, wireless communication standard and the like.

The code may be stored on a memory (not shown in FIG. 1A or 1B). The memory may be configured to store data and/or information associated with the encoder 105 and/or the decoder 110 or a larger system. For example, the memory may be configured to store data tables including, for example, data tables related to codebooks or parameters for use by the encoder 105 and/or the decoder 110 to encode and/or decode images. For example, the memory may be configured to store data tables including, for example, data tables storing gamma values. The memory may be a shared resource. For example, the encoder 105 and/or the decoder 110 may be an element of a larger system (e.g., a mobile device, a personal computer or a server). Therefore, the memory may be configured to store data and/or information associated with other elements (e.g., web browsing or wireless communication) within the larger system. By way of example, the memory may store an operating system, application programs, program data, and the like. In this regard, the memory may be implemented as a combination of one or more of volatile and non-volatile memory, such as DRAM, EEPROM, MRAM, flash memory, and the like. In addition, or alternatively, the memory may include a device configured to read from and write to a removable media, such as, a floppy disk, a CD-ROM, a DVD-ROM, or other optical or magnetic media.

The decoder 110 may decode an image (e.g., image 125) to be output to one or more output devices, such as, displays, printers, facsimile machines, etc. The image 125 may be a previously encoded. In other words, the image 125 may be disassociated from an original image (e.g., the whereabouts of the original image or the original image is unknown) used as a base to generate (or encoded) the image 125

Figure 2A:
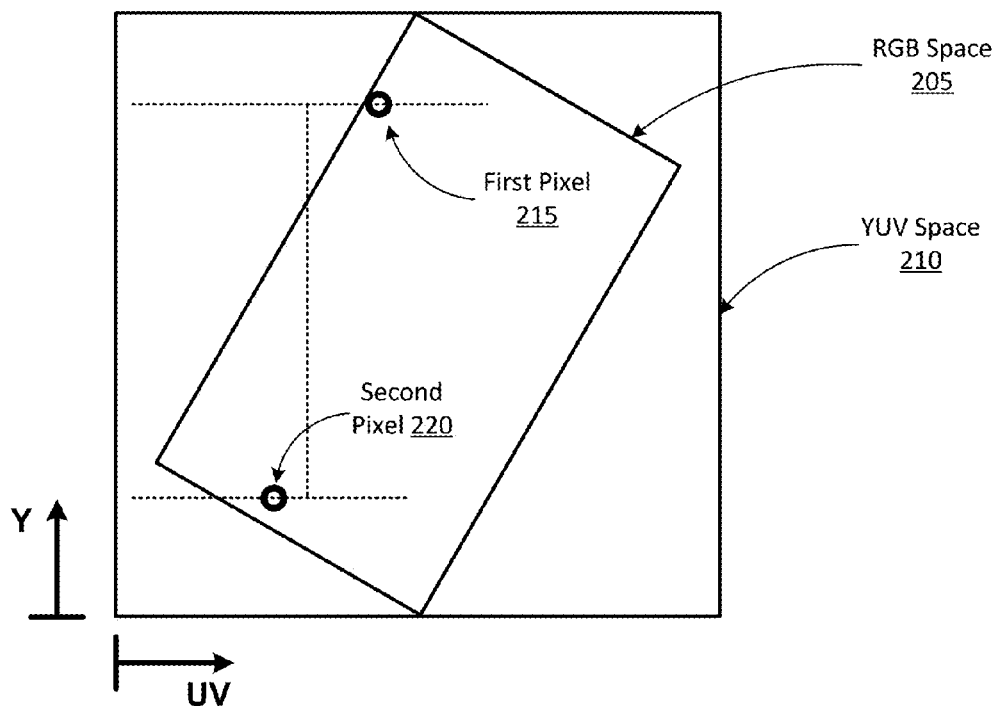
FIGS. 2A, 2B, 2C and 2D illustrate a graphical representation of adjacent pixels in various stages of encoding/decoding in a YUV color space and a RGB color space according to at least one example embodiment.

FIGS. 2A, 2B, 2C and 2D illustrate a graphical representation of adjacent pixels in various stages of encoding/decoding in a YUV color space and a RGB color space according to at least one example embodiment. As shown in FIG. 2A, a RGB color space 205 is surrounded by a YUV color space 210 with the YUV color space 210 having larger dimensions than the RGB color space 205. Although the RGB color space 205 and the YUV color space 210 are shown as two-dimensional, the RGB color space 205 and the YUV color space 210 are three-dimensional spaces.

Each of the dimensions (R, G, B) in the RGB color space 205 is scaled in a range from 0 to 255 (e.g., for storage as representative image data). About a quarter (¼) of the YUV color space 210 represents colors.

In FIG. 2A, a first pixel 215 and a second pixel 220 represent adjacent pixels in the image (e.g., x,y=1920,1080 is adjacent to 1920,1079). In other words, the first pixel 215 and the second pixel 220 have not been transformed, converted and/or encoded into representative pixels in the YUV color space 210.

Figure 2B:
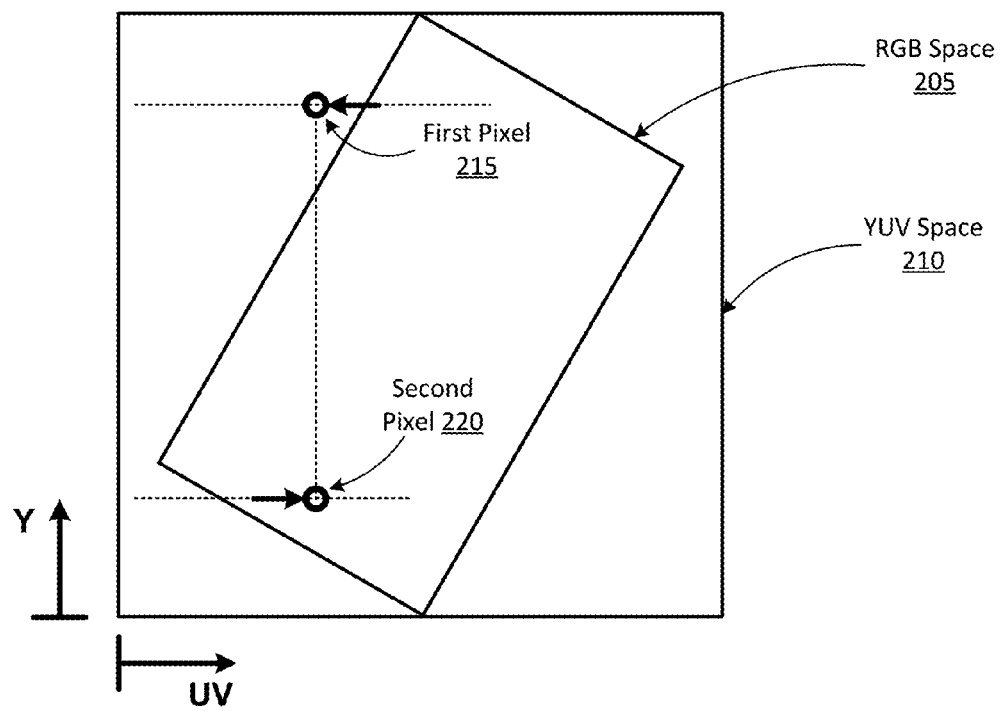

In FIG. 2B, the first pixel 215 and the second pixel 220 represent adjacent pixels in the YUV color space 210. In other words, the first pixel 215 and the second pixel 220 have been transformed, converted and/or encoded from the RGB color space 205 into representative pixels in the YUV color space 210. The first pixel 215 and the second pixel 220 are adjacent because the first pixel 215 and the second pixel 220 share the same UV value and have different Y values. As shown in FIG. 2B, the representative YUV value(s) for the first pixel 215 causes the first pixel 215 to be outside of the RGB color space 205 and the representative YUV value(s) for the second pixel 220 results in the second pixel 220 being inside of the RGB color space 205. Transforming, converting and/or encoding a pixel from the RGB color space 205 into representative pixels in the YUV color space 210 may include looking up a representative value in a lookup table or calculating a value using an algorithm. For example Y, U and V could be calculated as follows:

$$Y=0.2125R+0.7154G+0.0721B \quad (1)$$

Then scaled as $Y=16+219 \times Y$ (from eqn. 1) (2)

where 16 and 219 scale Y to a standard computer color space (e.g., YUV color space 210).

$$U=(0.5/(1-0.114)) \times (B-Y) \quad (3)$$

Then scaled as $U=128+224 \times U$ (from eqn. 3) (4)

where 128 and 224 scale U to a standard computer color space (e.g., YUV color space 210).

$$V=(0.5/(1-0.299)) \times (R-Y) \quad (5)$$

Then scaled as $V=128+224 \times V$ (from eqn. 5) (6)

where 128 and 224 scale V to a standard computer color space (e.g., YUV color space 210).

$$R=(Y+1.402 \times (U-128)) \quad (7)$$

$$G=(Y-0.344 \times (V-128)-0.714 \times (U-128)) \quad (8)$$

$$B=(Y+1.772 \times (V-128)) \quad (9)$$

Other algorithms for converting RGB values to YUV values (and vise versa) are within the scope of this disclosure.

Figure 2C:
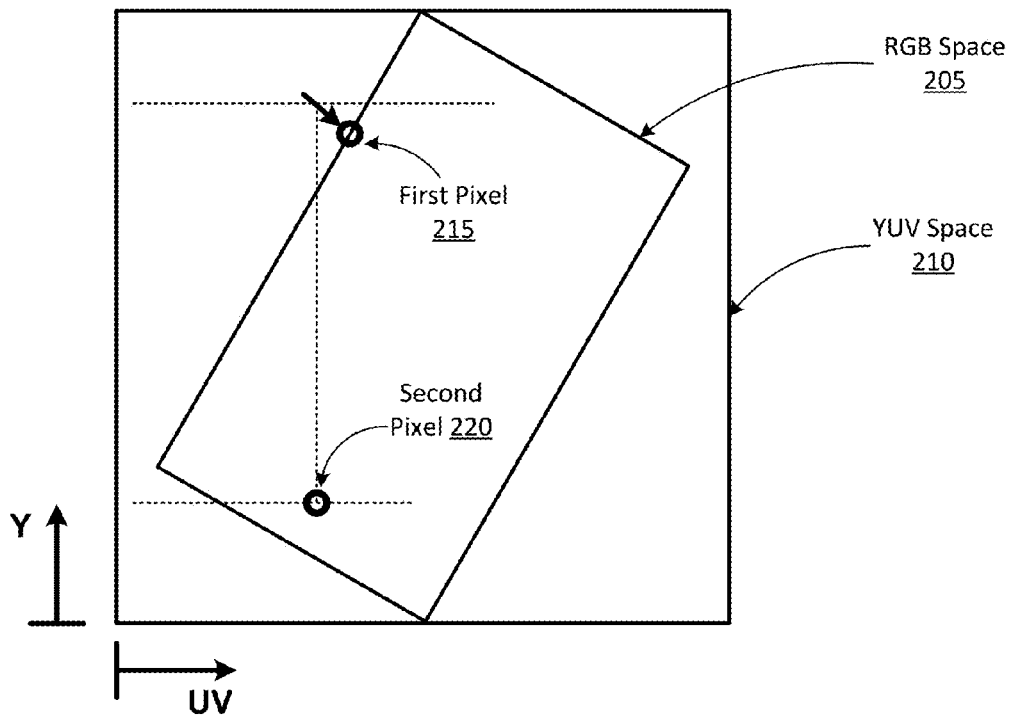

In FIG. 2C, the first pixel 215 and the second pixel 220 represent adjacent pixels in the RGB color space 205 following a decoding operation. In other words, the first pixel 215 and the second pixel 220 have been transformed, converted and/or decoded from the YUV color space 210 back to the RGB color space 205. As shown in FIG. 2C, the first pixel 215 has not been converted back to the same (or substantially the same) RGB value as shown in FIG. 2A. Therefore, the first pixel 215 has been encoded and decoded with some loss as compared to the original first pixel 215 shown in FIG. 2A. This loss results in distortion or artifacts in the resultant image. This loss is especially distortive in images with colored text.

For example, referring to FIG. 13A, image 1305 shows an original image and image 1310 shows a decoded image using the decoding technique shown in FIG. 2C. This technique is sometimes called "clipping" or "clamping" because the pixel (e.g., the first pixel 215) is set to a valid value in the RGB color space 205. In other words, any value for R, G, or B that is outside the valid range for the RGB color space 205 (e.g., 0-255) is set to a valid value in the RGB color space 205 (e.g., 0 or 255) depending on where the pixel is located in the RGB color space 205. In other words, if a value for one or more of the colors, R, G and/or B), is greater than 255 or less than 0, the value for the out of range color is set or "clipped" to 255 or 0, respectively. For example, if after a decoding operation a value for G is 261, the decoding technique described with regard to FIG. 2C will set the value for G to 255. Further, if after a decoding operation a value for B is −7, the decoding technique described with regard to FIG. 2C will set the value for B to 0.

Figure 2D:
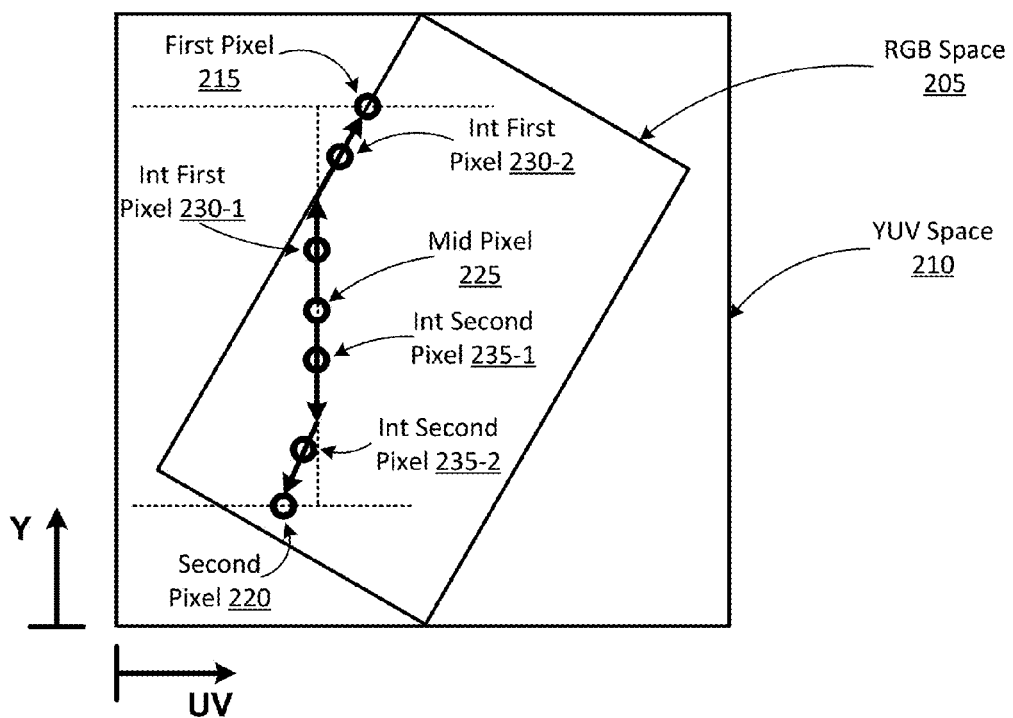

In FIG. 2D, the first pixel 215 and the second pixel 220 represent adjacent pixels in the RGB color space 205 during the process of a decoding operation according to at least one example embodiment. The first pixel 215 and the second pixel 220 may be in the process of being transformed, converted and/or decoded from the YUV color space 210 back to the RGB color space 205 (e.g., reconstructed in the RGB color space 205). In one example implementation, a mid pixel 225 is determined as an encoded pixel. In other words, an encoded image may include a plurality of pixels. Each of the plurality of pixels may be a mid pixel 225. For example, as part of an encoding process an N×N (e.g., 1×2, 2×2, 2×4, 4×4, 4×8, 8×16, 16×16, and the like) block of pixels may be down sampled and averaged. For example, a 1×2 pixel block could be down sampled, determined or calculated based on an average value for R, G and B in the RGB color space 205. For example, (R1+R2)/2=Rmid, (G1+G2)/2=Gmid and (B1+B2)/2=Bmid, where R1 is the R value for the first pixel 215 and R2 is the R value for the second pixel 220 and so forth. As another example, a 2×2 block of pixels could be determined or calculated as (R1+R2+R3+R4)/4=Rmid, (G1+G2+G3+G4)/4=Gmid and (B1+B2+B3+B4)/4=Bmid, where (in addition to the first example) R3 is the R value for a third pixel and R4 is the R value for a fourth pixel and so forth. Accordingly, the mid pixel 225 may be a down sampled and averaged pixel associated with an encoded image.

After determining a location of the mid pixel 225 (e.g., as a received encoded pixel), two pixels can be repositioned along the Y axis. One (shown as int first pixel 230-1) in the positive direction (up in FIG. 2D) and one (shown as int second pixel 235-1) in the negative direction (down in FIG. 2D) respectively. For example, +1 could be added to the Y value for int first pixel 230-1 and −1 could be added to the Y value for int second pixel 235-1. The two pixels (int first pixel 230-1, int second pixel 235-1) are repositioned along the Y axis until one of the two pixels has an equivalent R, G, or B at the boundary of the RGB color space 205 (e.g., 0 or 255). For example, FIG. 2D shows int first pixel 230-1 reaching the boundary of the RGB color space 205 (e.g., R, G or B=255).

Then the pixel that reached the boundary is repositioned along the boundary until a reconstructed UV value (for its representative pixel 215, 220) is reached. As shown in FIG. 2D, int first pixel 230-2 is repositioned along the boundary of the RGB color space 205 until the reconstructed UV value for the first pixel 215 is reached. Concurrently, the other of the two pixels is symmetrically moved in the YUV color space 210 until it reaches a reconstructed UV value (for its representative pixel 215, 220). As shown in FIG. 2D, int second pixel 235-2 symmetrically moves (e.g., in relation to the vertical dashed line) with int first pixel 230-2 until the reconstructed UV value for the second pixel 220 is reached.

Comparing the position of the first pixel 215 and second pixel 220 as shown in FIG. 2A to the position of the first pixel 215 and the second pixel 220 as shown in FIG. 2D, it can be seen that the transformed, converted and/or decoded pixels (215, 220) from the YUV color space 210 back to the RGB color space 205 (e.g., reconstructed in the RGB color space 205) have minimal loss. In other words, the first pixel 215 and the second pixel 220 have been reconstructed in virtually the same position in FIG. 2D as the first pixel 215 and the second pixel 220 were originally in FIG. 2A.

Again referring to FIG. 13A, image 1305 shows the original image and image 1315 shows a decoded image using the decoding technique according to an example embodiment described with regard to FIG. 2D. The text (e.g., color text on a white background) shown in image 1315 shows almost no distortion or artifacts when compared to image 1310 (reconstructed using the technique described with regard to FIG. 2C).

Figure 3:
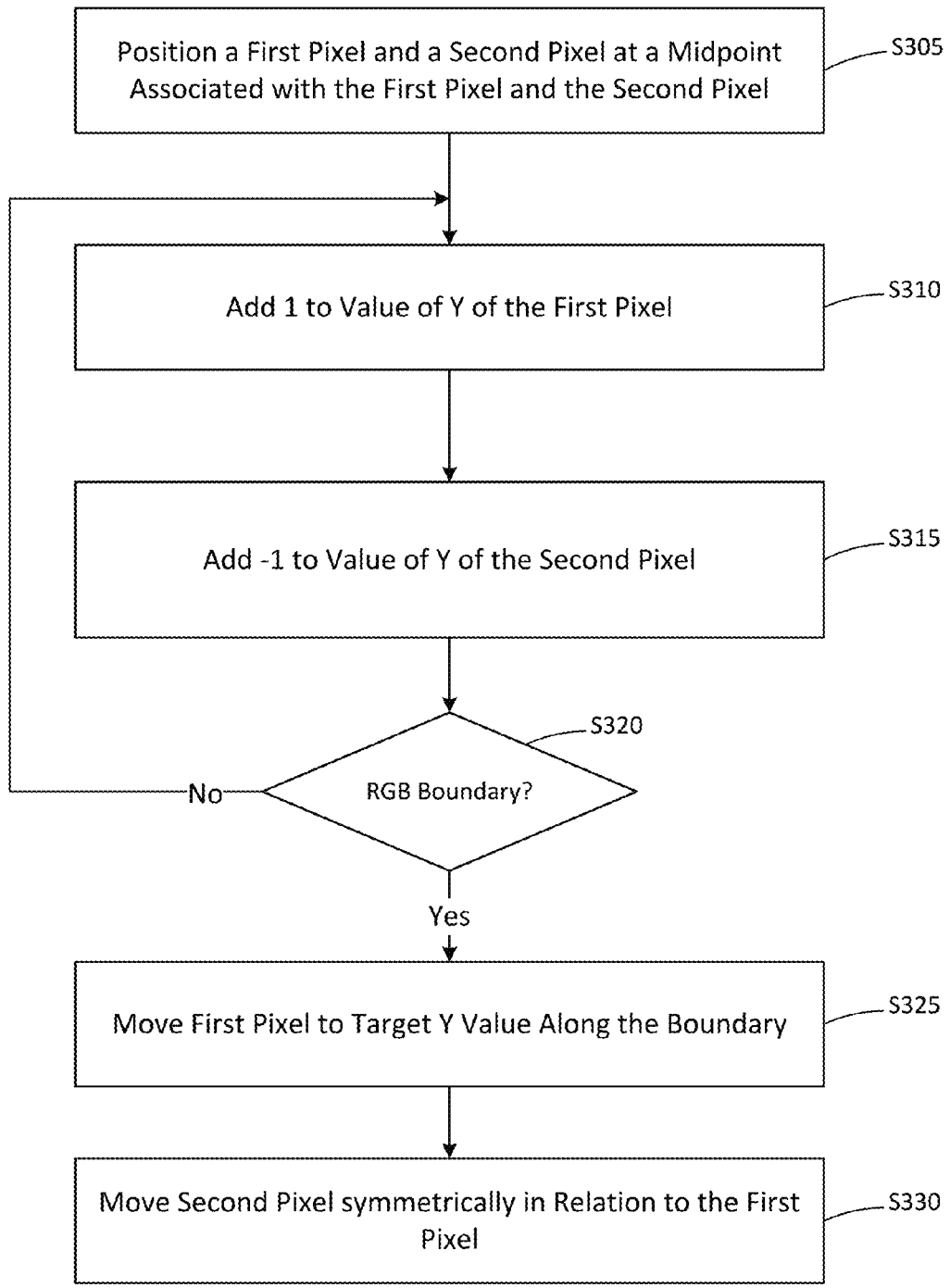
FIG. 3 illustrates a flow chart of a method of decoding a pixel according to at least one example embodiment.

FIG. 3 illustrates a flow chart of a method of decoding a pixel according to at least one example embodiment. The steps described with regard to FIG. 3 may be performed due to the execution of software code stored in a memory associated with an apparatus (e.g., as shown in FIGS. 1, 6, 7 and 8) and executed by at least one processor associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIG. 3.

As shown in FIG. 3, in step S305 a first pixel and a second pixel are positioned at a midpoint of the first pixel and the second pixel. For example, as described above with regard to FIG. 2D, a midpoint pixel (e.g., mid pixel 225) can be a received encoded pixel that was down sampled and averaged during an encoding process. For example, the received encoded pixel may have been encoded such that the pixel is an average of two or more pixels. Then two pixels (e.g., int first pixel 230-1 and int second pixel 235-1) can be positioned at the midpoint pixel (e.g., int first pixel 230-1 and int second pixel 235-1 can be positioned at the position of mid pixel 225 as shown in FIG. 2D).

In step S310 one (1) is added to the value of Y of the first pixel. In step S315 negative one (−1) is added to value of Y of second pixel. For example, as described above with regard to FIG. 2D the int first pixel 230-1 and the int second pixel 235-1 can be moved to positions along Y in opposite directions by adding a value (1 and −1) to a Y value for the int first pixel 230-1 and the int second pixel 235-1.

In step S320 a determination is made as to whether or not a boundary of the RGB color space (e.g., the RGB color space 205) has been reached. For example, the YUV values for the int first pixel 230-1 and the int second pixel 235-1 can be converted to RGB values. If one of the R, G, and/or B values is equal to zero (0) or (255), the boundary of the RGB color space 205 has been reached. If the boundary of the RGB color space has been reached, processing continues to step S325. Otherwise, processing returns to step S310.

In step S325 the first pixel is positioned to a target Y (or equivalent RGB) value along the boundary of the RGB color space. For example, as shown in FIG. 2D int first pixel 230-2 is moved to the Y position of the first pixel 215 while moving along the boundary of the RGB color space (e.g., the RGB color space 205). This results in a position (e.g., RGB values) of a reconstructed pixel closely matching the original pixel. For example, as shown in FIGS. 2A and 2D, the first pixel 215 illustrated in FIG. 2D is shown as being in relatively close (essentially a same) position as the first pixel 215 illustrated in FIG. 2A.

In step S330 the second pixel is moved symmetrically in relation to the first pixel. For example, as shown in FIG. 2D, int second pixel 235-2 symmetrically moves (e.g., in relation to the vertical dashed line) with int first pixel 230-2 until the Y value for the second pixel 220 is reached.

Using the technique described with regard to FIG. 3, comparing the position of the first pixel 215 and second pixel 220 as shown in FIG. 2A to the position of the first pixel 215 and the second pixel 220 as shown in FIG. 2D, it can be seen that the transformed, converted and/or decoded pixels (215, 220) from the YUV color space 210 back to the RGB color space 205 (e.g., reconstructed in the RGB color space 205) have minimal loss. In other words, the first pixel 215 and the second pixel 220 have been reconstructed in virtually the same position (e.g., RGB values) in FIG. 2D as the position (e.g., RGB values) of the first pixel 215 and the second pixel 220 were originally in FIG. 2A.

Figure 4A:
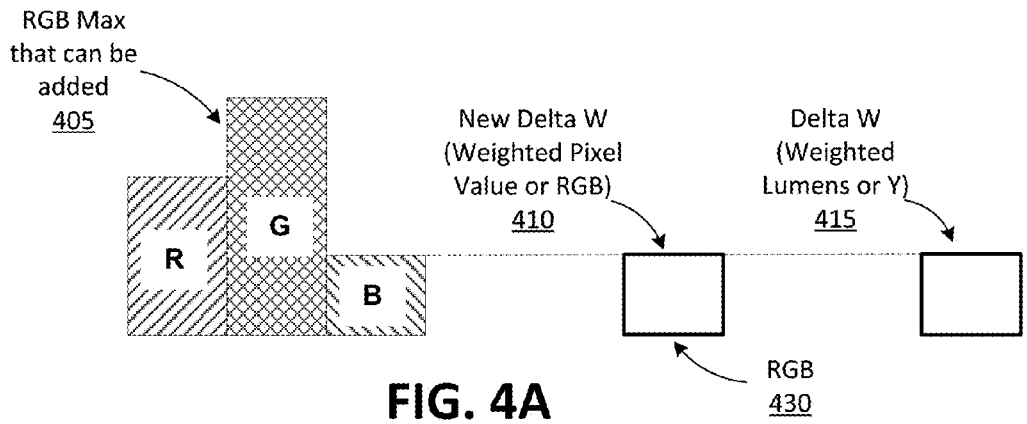
FIGS. 4A, 4B and 4C illustrate a block diagram of a flow for decoding a pixel according to at least one example embodiment.
Figure 4B:
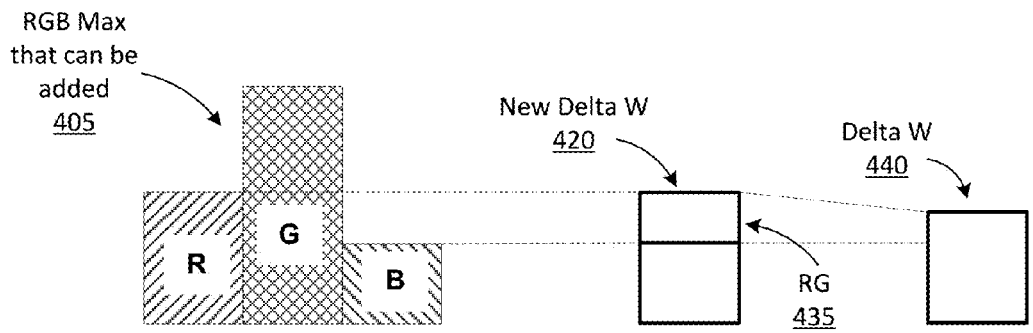
Figure 4C:
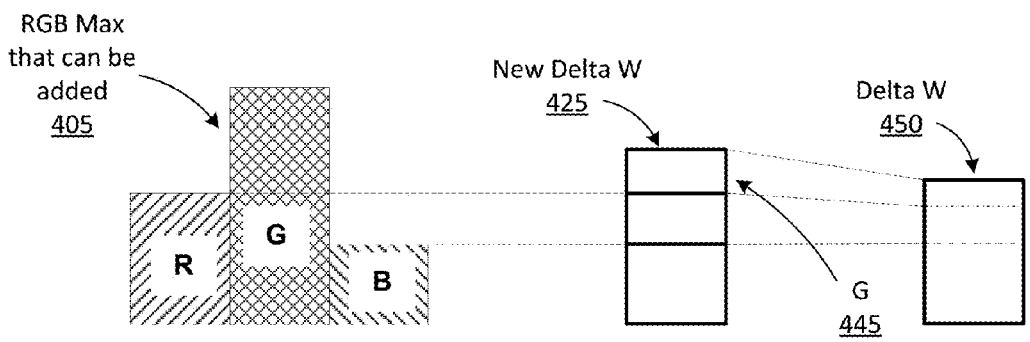

FIGS. 4A, 4B and 4C illustrate a block diagram of a flow for decoding a pixel according to at least one example embodiment. The technique described with regard to FIGS. 4A, 4B and 4C may be considered a simplification (e.g., fewer processing steps) of the technique described above with regard to FIGS. 2D and 3 (after the midpoint is determined or calculated. As shown in FIG. 4A, a maximum R, a maximum G and a maximum B is determined or calculated (herein after Rmax, Gmax and Bmax). This is illustrated as RGB max that can be added 405. As is shown in FIG. 4A, Bmax has the least amount (or smallest value) that can be added, Gmax has the most amount (highest value) that can be added, and Rmax is in between (middle value) Bmax and Gmax.

In an example implementation, a first value (or delta R) can be determined to add to R, a second value (or delta G) can be determined to add to G and a third value (or delta B) can be determined to add to B such that a pixel positioned at a midpoint can be repositioned without crossing a RGB boundary. In other words, FIGS. 4A, 4B and 4C illustrate determining a delta triplet $(R_D, G_D, B_D)$ such that a pixel (R,G,B), bounded by the RGB color space, can be determined or calculated as $(R,G,B)=(R_M,G_M,B_M)+(R_D,G_D,B_D)$, where $(R_M, G_M, B_M)$ represents the midpoint pixel. Referring to FIG. 4C, the pixel value is shown as an amount (or delta) of white W (e.g., for a pixel in the RGB color space) indicated by new delta W 425. For example, new delta W 425 can be added to the RGB of the midpoint which should result in a change in position for a pixel that is on (or close) to a boundary of a RGB color space (e.g., the RGB color space 205). The new position of the pixel can also be represented at a Y position and at a UV position of the pixel in the YUV color space. Accordingly, Delta W 450 represents a change in Y in the YUV color space based on new delta W 425.

As shown in FIG. 4A, the new delta W 410 is set as RGB 430 (by adding RGB 430 to zero). The value of R, G and B in RGB 430 are all equal and have a value equal to the value of Bmax (the smallest value of the three RGB max that can be added 405 values). In other words, in triplet format the new delta W 410 can be represented as (Bmax,Bmax,Bmax). This results in a maximum value for B within the RGB color space (e.g., RGB color space 205). In other words, should the new delta W 410 be added to the RGB values for the midpoint, B should be at a boundary value (e.g., 0 or 255).

As shown in FIG. 4B, the new delta W 420 is set by adding RG 435 to the new delta W 410. The value of R and G in RG 435 are equal and have a value equal to the difference between what has already been added to R (in this case Bmax) and Rmax. Accordingly, the value that can be added to the new delta W 410 to get the new delta W 420 is Rmax−Bmax. In other words, in triplet format the new delta W 420 can be represented as (Bmax,Bmax,Bmax)+(0, Rmax−Bmax, Rmax−Bmax).

The result can be checked against the value of a target Y (e.g., a Y value associated with one of the first pixel 215 or the second pixel 220 as illustrated in FIG. 2A). If the result is greater than the target Y, Rmax−Bmax can be replaced by a value that does not exceed Y. In either case, this can result in a maximum value for B (carried over from FIG. 4A) and possibly R (if R from new delta W 410+Rmax−Bmax equals a boundary value (e.g., 0 or 255)) associated with the RGB color space (e.g., RGB color space 205). In other words, should the new delta W 420 be added to the RGB values for the midpoint, B and R may be at a boundary value (e.g., 0 or 255).

Further, by adding values for just R and G to calculate the new delta W 420, should the new delta W 420 be added to the midpoint pixel RGB, the resultant pixel RGB will start to turn or move away from a vertical line through the encoded UV midpoint value. In other words, referring to eqns. 1-6, in a second iteration for a calculation of Y, U and V based on R, G and B, B stays the same and R and G change which results in new Y, U and V values that are not proportional to the Y, U and V values from the first iteration (a calculation of Y, U and V based on the values described with regard to FIG. 4A). This is illustrated with regard to Delta W 415 which changes proportionally with regard to new delta W 410 (illustrated by the straight dotted line extending from the top of the B in RGB max that can be added 405 to delta W 415 as compared to the sloped dotted line extending from the top of new delta W 420 to delta W 440.

As shown in FIG. 4C, the new delta W 425 is set by adding G 445 to the new delta W 420. The value G 445 can have a value equal to the difference between what has already been added to G (in this case Bmax+(Rmax−Bmax) or Rmax) and Gmax. Accordingly, the value that can be added to the new delta W 420 to get the new delta W 425 is Gmax−Rmax. In other words, in triplet format the new delta W 425 can be represented as (Bmax,Bmax,Bmax)+(0,Rmax−Bmax, Rmax−Bmax)+(0,0,Gmax−Rmax).

The result can be checked against the value of a target Y (e.g., a Y value associated with one of the first pixel 215 or the second pixel 220 as illustrated in FIG. 2A). If the result is greater than the target Y, Gmax−Rmax can be replaced by a value that does not exceed Y. In either case, this may result in a maximum value for B, (possibly) R and (unlikely) G within the RGB color space (e.g., RGB color space 205). In other words, should the new delta W 425 be added to the RGB values for the midpoint, B and R may be at a boundary value (e.g., 0 or 255) and G likely will not be at a boundary value (but could be approaching one).

Further, by adding values for just G to get the new delta W 425, should the new delta W 425 be added to the midpoint RGB, the resultant pixel RGB will continue to turn or move away from the vertical line through the encoded UV midpoint value. In other words, referring to eqns. 1-6, in a third iteration for a calculation of Y, U and V based on R, G and B, R and B stay the same and G changes which results in new Y, U and V values that are not proportional to the Y, U and V values from the first iteration (a calculation of Y, U and V based on the values described with regard to FIG. 4A) or the second iteration (a calculation of Y, U and V based on the values described with regard to FIG. 4B). This is illustrated with regard to Delta W 450 changing less proportionally with regard to new delta W 425 illustrated by a more sloped dotted line extending from the top of new delta W 425 to delta W 450 when compared to the sloped dotted line extending from the top of new delta W 420 to delta W 440.

Figure 5:
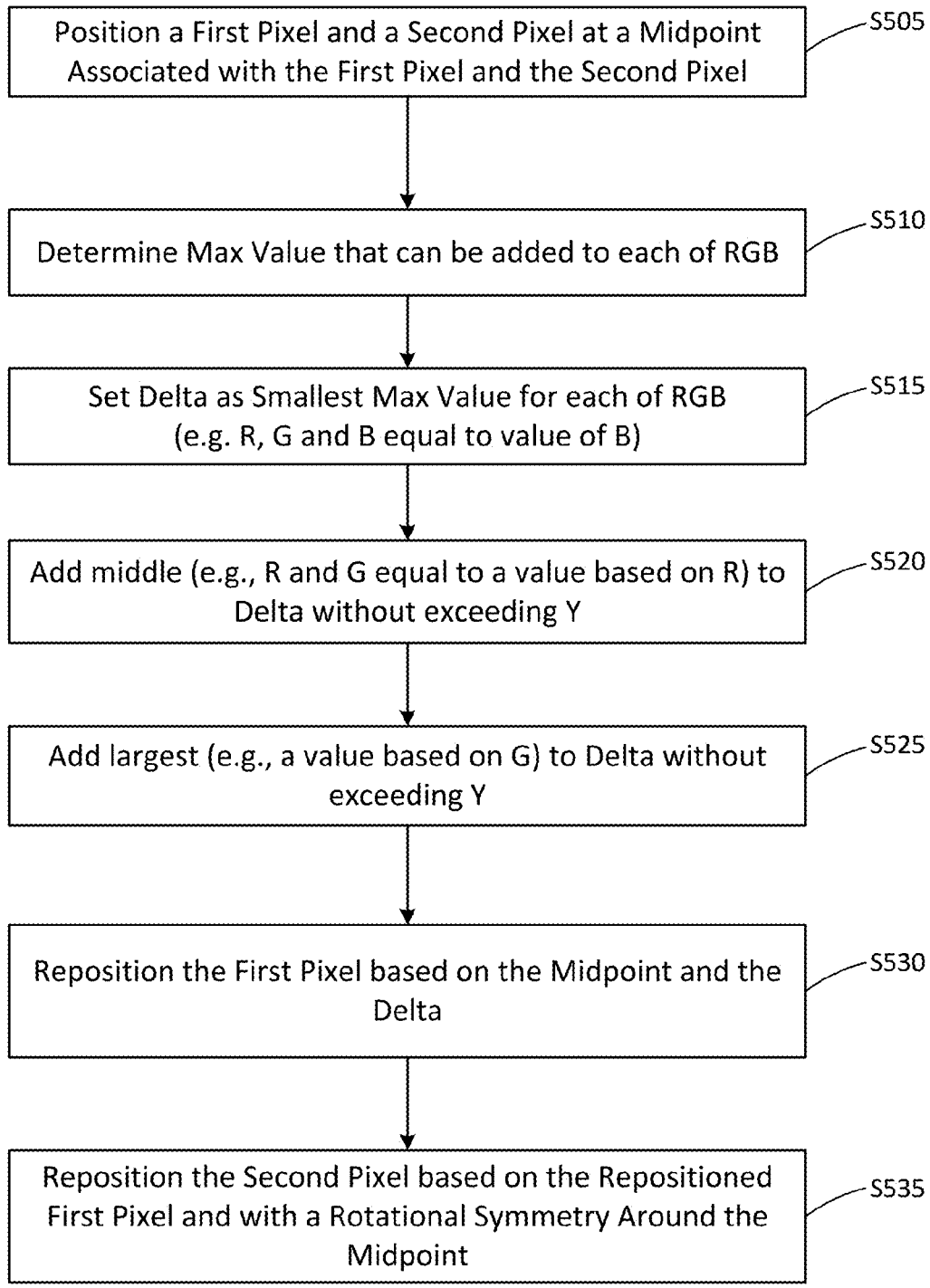
FIG. 5 illustrates a flow chart of a method of decoding a pixel according to at least one example embodiment.

FIG. 5 illustrates a flow chart of a method of decoding a pixel according to at least one example embodiment. The steps described with regard to FIG. 5 may be performed due to the execution of software code stored in a memory associated with an apparatus (e.g., as shown in FIGS. 1, 6, 7 and 8) and executed by at least one processor associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIG. 5.

As shown in FIG. 5, in step S505 a first pixel and a second pixel are positioned at a midpoint associated with the first pixel and the second pixel. For example, as described above with regard to FIG. 2D, a midpoint pixel (e.g., mid pixel 225) can be a received encoded pixel that was down sampled and averaged during an encoding process. For example, the received encoded pixel may have been encoded such that the pixel is an average of two or more pixels. Then two pixels (e.g., int first pixel 230-1 and int second pixel 235-1) can be positioned at the midpoint pixel (e.g., int first pixel 230-1 and int second pixel 235-1 can be positioned at the position of mid pixel 225 as shown in FIG. 2D).

In step S510 a maximum value that can be added to each value of RGB of the midpoint pixel. For example, a maximum value that can be added to each value of RGB (henceforth Rmax, Gmax, and Bmax) of the midpoint pixel can be solved for using the maximum value that can be added to the midpoint of Y within the boundary for the RGB color space. Then an equivalent R, G and B value can be calculated and set as Rmax, Gmax, and Bmax, respectively. In one example implementation, three simultaneous equations can be solved using equations 1, 3 and 5. The results can then be converted to the RGB color space using equations 7, 8 and 9.

In step S515 a delta is set using the smallest (or lowest value) of the maximum values that can be added to each RGB value. For example, the Rmax, Gmax, and Bmax could be sorted and ordered from smallest value to largest value. Referring to FIGS. 4A-4C, the sorted order would be Bmax, Rmax, Gmax (smallest to largest). Therefore, according to an example implementation, a value of R, a value of G and a value of B could all be set to equal Bmax. The delta can then be set using the RGB values set as the value of Bmax.

In step S520 a middle value is added to delta. For example, the middle value can be based on the maximum value that can be added to the middle value (of the sorted and ordered Rmax, Gmax, and Bmax). In an example implementation, referring to FIGS. 4A-4C, Rmax can be the middle value. The scaled value that can be added to delta can be the difference between what has already been added to R (in this case Bmax) and Rmax as determined or calculated in step S510. Accordingly, the scaled middle value that can be added to delta is Rmax−Bmax.

In step S525 a largest value is added to delta. For example, the largest value can be based on the maximum value that can be added to the largest value (of the sorted and ordered Rmax, Gmax, and Bmax). In an example implementation, referring to FIGS. 4A-4C, Gmax can be the largest value. The scaled value that can be added to G is the difference between what has already been added to G (in this case Bmax+(Rmax−

Bmax) or Rmax) and Gmax as determined or calculated in step S510. Accordingly, the scaled largest value that can be added to delta is Gmax−Rmax.

In step S530 the first pixel is repositioned based on the midpoint and the delta. For example, the RGB values of delta can be added to midpoint RGB values to reposition the first encoded pixel. In step S535 the second pixel is repositioned based on the repositioned first pixel and with a rotational symmetry around the midpoint. In other words, if the first pixel was moved up and to the right, the second pixel is repositioned by moving it down and to the left (e.g., as shown in FIG. 2D).

Figure 6:
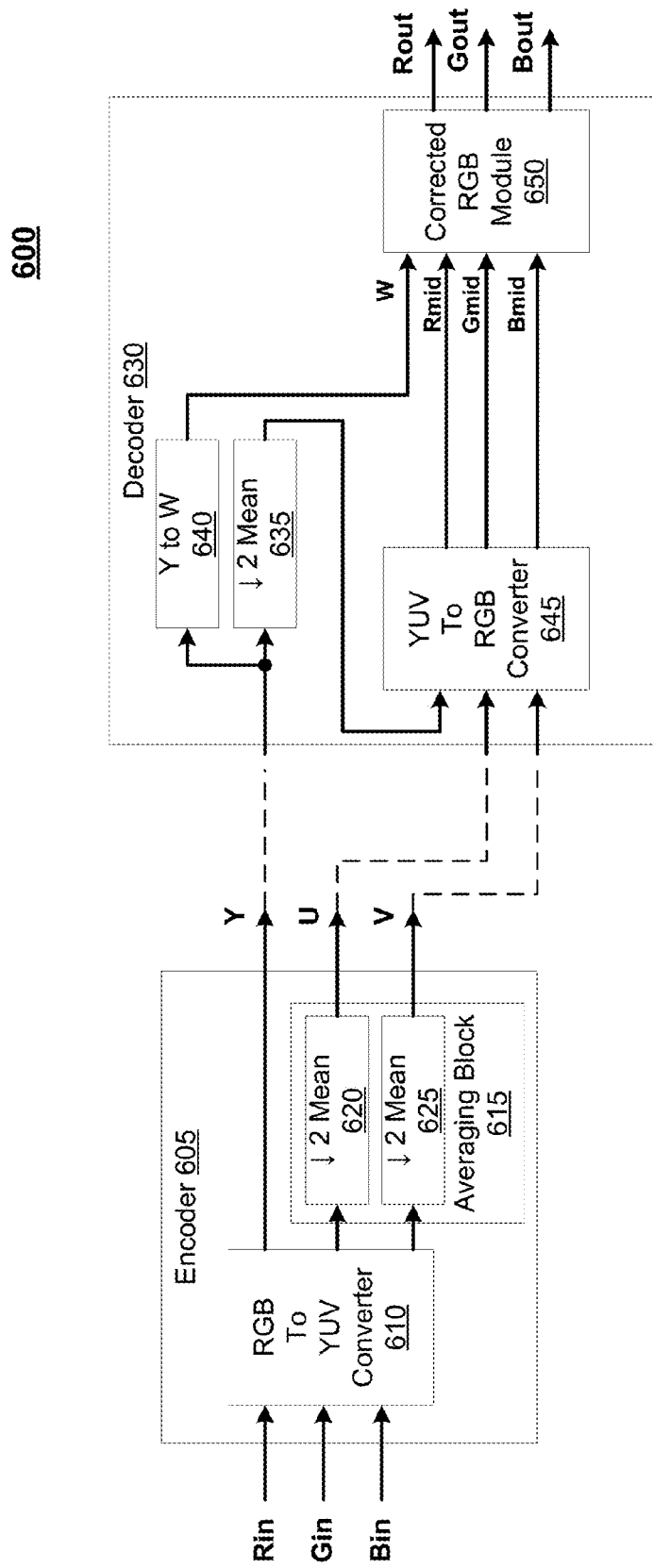
FIG. 6 illustrates another block diagram of a system including an encoder and a decoder according to at least one example embodiment.

FIG. 6 illustrates another block diagram of a system 600 including an encoder 605 and a decoder 630 communicatively coupled to the encoder 605 according to at least one example embodiment. As shown in FIG. 6, the encoder 605 includes a RGB to YUV converter 610 and an averaging block 615. The averaging block 615 includes a mean element 620 and a mean element 625. Although not shown, the encoder 605 may include other elements not shown. For example, the encoder could include a discrete cosine transform (DCT) module, a quantizer, an entropy encoder, and the like. Further, the encoder 605 may be communicatively coupled to other devices as part of a larger system. For example, the encoder may communicatively coupled a server or other device configured to transmit an encoded image to another device (e.g., computing device). The other device may or may not include a decoder (e.g., decoder 630) configured to decode an encoded image.

The RGB to YUV converter 610 may be configured to convert a pixel, a block of pixels, an image, a portion of an image, and the like from a RGB color space (e.g., RGB color space 205) to a YUV color space (e.g., YUV color space 210). For example, the RGB to YUV converter 610 may be configured to convert a pixel from a RGB color space to a YUV color space using equations 1-6. Accordingly, the RGB to YUV converter 610 may be configured to receive an input Rin, Gin, and Bin and output Y, U and V based on the input Rin, Gin, and Bin and equations 1-6. In an example implementation, the input Rin, Gin, and Bin may be an N×N (e.g., 2×2, 2×4, 4×4, 16×16, and the like) block of pixels. Accordingly, the averaging block may be configured to average each N×N block of pixels. As is shown in FIG. 6, the mean element 620 may be configured to average Gin associated with the N×N block of pixels and the mean element 625 may be configured to average Bin associated with the N×N block of pixels. In an example implementation, the mean element 620, 625 may be further configured to down sample. In an example implementation, the mean element 620, 625 may be configured to down sample prior to using a 2×2 box filter to generate an average R, G and/or B value. In other words, the mean element 620, 625 may be configured to down sample a 2×2 block of pixels (four pixels) to two pixels that are the average of adjacent pixels or one pixel that is the average of four pixels.

The encoder 605 may then output an encoded N×N block of pixels in the YUV color space. An encoded image (in the YUV color space) may be generated based on a plurality of encoded N×N block of pixels. This image may be stored (e.g., as discussed above with regard to the datastore 120 or communicated to another device (e.g., to be displayed on a display of the device). Accordingly, the device may include decoder 630.

As shown in FIG. 6, the decoder 630 includes a mean element 635, a Y to W (converter) block 640, a YUV to RGB converter 645, and a corrected RGB module 650. The mean element 635 may receive an N×N (e.g., 2×2, 2×4, 4×4, 16×16, and the like) Y block and output an average Y associated with the N×N block. The mean element 635 may be configured to down sample a 2×2 block of pixels (four pixels) to two pixels that are the average of adjacent pixels or one pixel that is the average of four pixels. The Y to W (converter) block 640 may be configured to convert a value of Y from a value based on a scale or range associated with the range of Y in the YUV color space [16, 235] to a value based on a scale or range associated with the range of W in the RGB color space [0, 255]. The Y to W (converter) block 640 may be configured to at least one of scale or offset the value of Y to convert Y to W. The YUV to RGB converter 645 receives as input the U and V (as input to the decoder 630) and an average Y as output from the mean element 635. The YUV to RGB converter 645 may be configured to calculate R, G and B based on Y, U and V using equations 7-9 and output R, G and B to the corrected RGB module 650. As discussed above, the pixel may represent (or be encoded as) an average pixel of an N×N block of pixels. Accordingly, the pixel may be a midpoint for each R, G, and B in the N×N block of pixels. For example, if the N×N block of pixels is a 2×2 block of pixels, there will be four (4) pixels (or four adjacent pixels) in the block. Accordingly, Rmid may be equal to (R0+R1+R2+R3)/4. Gmid and Bmid may similarly represent the average R and B of the 2×2 block of pixels. The corrected RGB module 650 may be configured to determine a corrected R, G and B for adjacent pixels based on the techniques described herein. For example, the corrected RGB module 650 may be configured to determine R, G and B for at least one pixel using the techniques describe above with regard to FIGS. 2D, 3, 4A-4C, and 5. An example implementation of a corrected RGB module 650 based on a 2×2 block of pixels is described below with regard to FIGS. 7A and 7B. The corrected RGB module 650 may be configured to generate an output of the decoder 630 as Rout, Gout and Bout.

As is shown in FIG. 6, the encoded N×N block of pixels in the YUV color space are communicated to the decoder 630 (e.g., as one of a plurality blocks in an encoded image) from the encoder 605. However, in an alternative embodiment, the decoder 630 may receive encoded N×N block of pixels in the YUV color space as one of a plurality blocks in an encoded image communicated from a computing configured to store an image (e.g., datastore 120). Further, in another alternative embodiment, the decoder 630 may be an element of a video decoding system configured to receive the encoded N×N block of pixels as one of a plurality blocks in a plurality of encoded images (e.g., as video data) communicated from a computing configured to serve video data.

The encoder 605 and/or the decoder 630 may be embodied as a special purpose processor (e.g., a graphics processing unit (GPU) or visual processing unit (VPU). The encoder 605 and/or the decoder 630 may be embodied as code executed by at least one processor that can be configured to execute computer instructions associated with an image (or video) encoding/decoding system. The at least one processor may be a shared resource. For example, the encoder 605 and/or the decoder 630 may be an element of a larger system (e.g., a mobile device, a personal computer or a server). Therefore, the at least one processor may be configured to execute computer instructions associated with other elements (e.g., web browsing or wireless communication) within the larger system. The encoder 605 and/or the decoder 630 may include a microprocessor, a micro-controller, an application specific integrated circuit (ASIC), and the like. Data may be transmitted from the encoder 605 over link (e.g., link 115 shown in FIGS. 1A and 1B) that communicatively couples the encoder 605 and/or the decoder 630. The link may be a wired or wireless link using, for example an internet, intranet, wireless communication standard and the like.

Figure 7A:
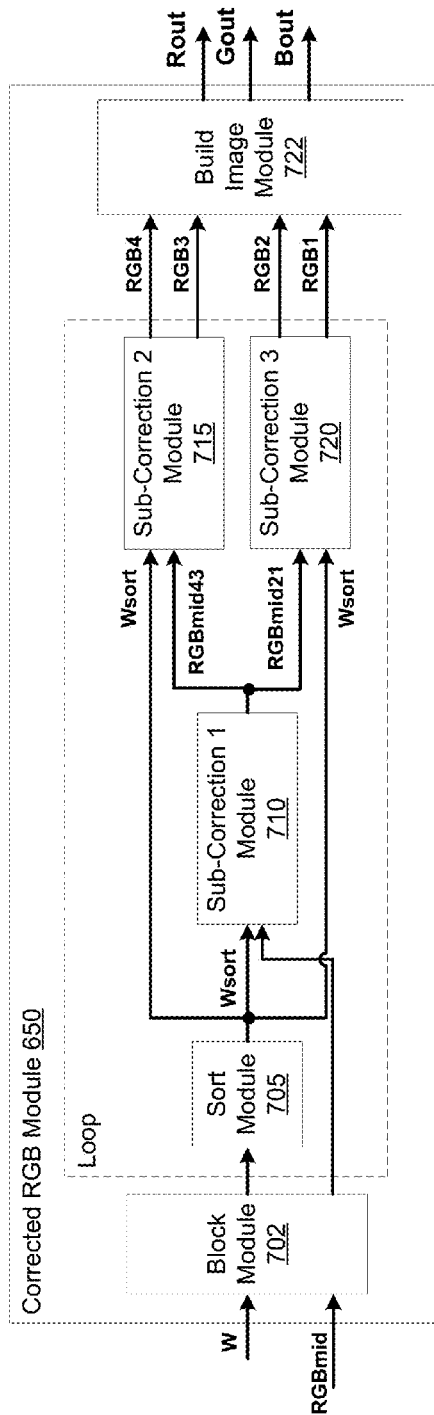
FIGS. 7A and 7B illustrate a block diagram of an element of a decoder according to at least one example embodiment.

FIG. 7A illustrates a block diagram of the corrected RGB module 650 of the decoder 630 according to at least one example embodiment. The corrected RGB module 650 may be configured to correct a 2×2 block of pixels. However, other block sizes are within the scope of this disclosure.

As shown in FIG. 7A, the corrected RGB module 650 includes a block module 702, a sort module 705, a sub-correction 1 module 710, a sub-correction 2 module 715, a sub-correction 3 module 720 and a build image module 722. The sub-correction 1 module 710, the sub-correction 2 module 715 and the sub-correction 3 module 720 each may be configured to determine R, G and B for at least one pixel using the techniques describe above with regard to FIGS. 2D, 3, 4A-4C, and 5. An example implementation of a sub-correction module is described below with regard to FIG. 8.

According to an example implementation, the corrected RGB module 650 receives as input W and RGBmid. The W may be a delta W as described above with regard to FIGS. 4A-4C. W and RGBmid may include at least one W and RGBmid value. For example, the W and RGBmid may include at least one W and RGBmid value that represent an image. The block module 702 may be configured to generate a plurality of N×N blocks from the at least one W and RGBmid value. In the example implementation, block module 702 may be configured to generate a plurality of 2×2 blocks of pixels. Accordingly, each block may include a W and four RGBmid values representing W and RGBmid values associated with adjacent pixels in the 2×2 block of pixels. The sort module 705 may be configured to output a sorted W (Wsort) based on the input W. The sorted W may be an ordered W (or delta W) with an order of smallest W to largest W (or, alternatively largest W to smallest W). Sorting W may determine the order, or grouping, in which R, G and B are corrected. For example, FIG. 7A shows a RGBmid21 and RGBmid43 organization. However, a different sort order may result in a RGBmid23 and RGBmid41 organization.

The sub-correction 1 module 710 may be configured to determine or calculate RGB values for two pixels as a RGBmid value between adjacent pixels in the 2×2 block of pixels. For example, the sub-correction 1 module 710 may be configured to determine or calculate RGBmid21 and RGBmid43 where pixel 1 is adjacent to pixel 2 and pixel 3 is adjacent to pixel 4. In this example, pixel 1 may also be adjacent to pixel 4 and pixel 2 may be adjacent to pixel 3. Accordingly, in an alternate implementation, the sub-correction 1 module 710 may be configured to determine or calculate RGBmid41 and RGBmid23.

The sub-correction 2 module 715 and the sub-correction 3 module 720 each may be configured to determine or calculate RGB values for two pixels respectively. As shown in FIG. 7A, sub-correction 2 module 715 is configured to determine or calculate the R, G and B values for pixel 3 as RGB3 and pixel 4 as RGB4, respectively. The sub-correction 2 module 715 determines or calculates the R, G and B values for pixel 3 and pixel 4 based on RGBmid43 as determined or calculated by the sub-correction 1 module 710 and the sorted W (or delta W) values Wsort. As shown in FIG. 7A, sub-correction 3 module 720 is configured to determine or calculate the R, G and B values for pixel 1 as RGB 1 and pixel 2 as RGB2, respectively. The sub-correction 3 module 720 determines or calculates the R, G and B values for pixel 1 and pixel 2 based on RGBmid21 as determined or calculated by the sub-correction 1 module 710 and the sorted W (or delta W) values Wsort.

As is shown in FIG. 7A, the correction can occur as a loop until each of the plurality of 2×2 blocks of pixels is corrected. Then in the build image module 722, the image is rebuilt (shown as Rout, Gout and Bout) from the plurality of corrected 2×2 blocks of pixels.

According to an example embodiment, a decoder can correct, reduce and/or eliminate (or substantially eliminate) a color artifact or distortion due to errors in or associated with an interpolation filter used in an encoder during a conversion of a pixel from a Luminance (or Luma)/Chrominance (YUV) color space to a Red/Green/Blue (RGB) color space. A color artifact or distortion due to errors in or associated with an interpolation filter used in an encoder can appear as "blockiness" in a decoded image. For example, referring to FIG. 13C, an image 1335 is a decoded image associated with an original image 1340. The image 1335 illustrates blockiness (mostly seen in the outline of the hat) that, in an example implementation, can be corrected, reduced and/or eliminated (or substantially eliminated) during decoding.

Figure 7B:
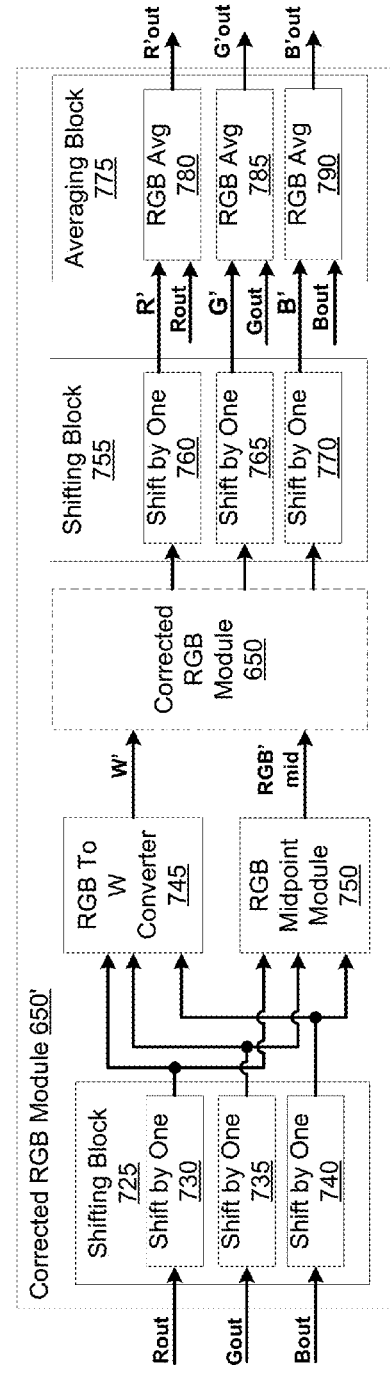

FIG. 7B illustrates a block diagram of the corrected RGB module 650' of the decoder 630 according to at least one example embodiment. The corrected RGB module 650' may be configured to correct a 2×2 block of pixels. However, other block sizes are within the scope of this disclosure. The corrected RGB module 650' may be configured to correct for "blockiness" in a decoded image. For example, the corrected RGB module 650' may be a modification of the corrected RGB module 650 where the output of the corrected RGB module 650 Rout, Gout, and Bout, respectively, are shifted, then a new W (shown as W') and a new RGBmid (shown as RGB'mid) are generated and looped back or feedback as the input to the corrected RGB module 650 and new output pixels are generated (shown as R'out, G'out, and B'out) as discussed above with regard to FIG. 7A.

As shown in FIG. 7B, the corrected RGB module 650' includes a shifting block 725, a RGB to W converter 745, a RGB midpoint module 750, the corrected RGB module 650, a shifting block 755 and an averaging block 775. The RGB to W converter 745 may be configured to convert RGB to W (e.g., a grayscale) using a grayscale conversion technique. For example, the RGB to W converter 745 may be configured to convert RGB to W by eliminating hue and saturation information while retaining luminance information. Alternatively, and/or in addition to, the RGB to W converter 745 may be configured to convert RGB to W by averaging RGB (e.g., W=(R+Gn+B)/3). Alternatively, and/or in addition to, the RGB to W converter 745 may be configured to convert RGB to W by scaling RGB (e.g., W=0.2126×R+0.7152×G+0.0722×B).

The RGB midpoint module 750 may be configured to determine or calculate a midpoint for each R, G, and B in the N×N block of pixels. For example, if the N×N block of pixels is a 2×2 block of pixels, there will be four (4) pixels (or four adjacent pixels) in the block. Accordingly, Rmid may be equal to (R0+R1+R2+R3)/4. Gmid and Bmid can be similarly determined or calculated by the RGB midpoint module 750.

The shifting block 725 includes shift-by-one elements 730, 735, 740. The shift by one elements 730, 735, 740 may be configured to shift each pixel (e.g., R, G, and B) by one unit (e.g., a pixel) in a given direction. For example, the shift by one elements 730, 735, 740 may be configured to shift each pixel diagonally by one pixel. For example, the shift by one elements 730, 735, 740 may be configured to shift each pixel diagonally by one pixel down and to the right or left, or up and to the right or left.

The shifting block 755 includes shift by one elements 760, 765, 770. The shift by one elements 760, 765, 770 may be configured to shift each pixel (e.g., R, G, and B) by one unit (e.g., a pixel) in an opposite direction as the shift direction of the shift by one elements 730, 735, 740. For example, the shift by one elements 730, 735, 740 may be configured to shift each pixel diagonally by one pixel. For example, the shift by one elements 730, 735, 740 may be configured to shift each pixel diagonally by one pixel down and to the right or left, or up and to the right or left.

The averaging block 775 includes RGB Avg elements 780, 785, 790. The RGB Avg element 780, 785, 790 may be configured to average RGB values associated with two or more pixels. As shown in FIG. 7B, the RGB Avg element 780, 785, 790 may be configured to average Rout with R', Gout with G', and Bout with B'. For example, an average R, G, and B value associated with two or more pixels may be calculated as (Rout+R')/2, (Gout+G')/2, and (Bout+B')/2 for each pixel of the plurality of pixels that make up the image or corrected image.

The example embodiment discussed with regard to FIG. 7B may be configured to correct, reduce and/or eliminate (or substantially eliminate) a color artifact or distortion due to errors associated with clipping and in or associated with an interpolation filter used in an encoder during a conversion of a pixel from a Luminance (or Luma)/Chrominance (YUV) color space to a Red/Green/Blue (RGB) color space (also referred to as blocking).

Figure 8:
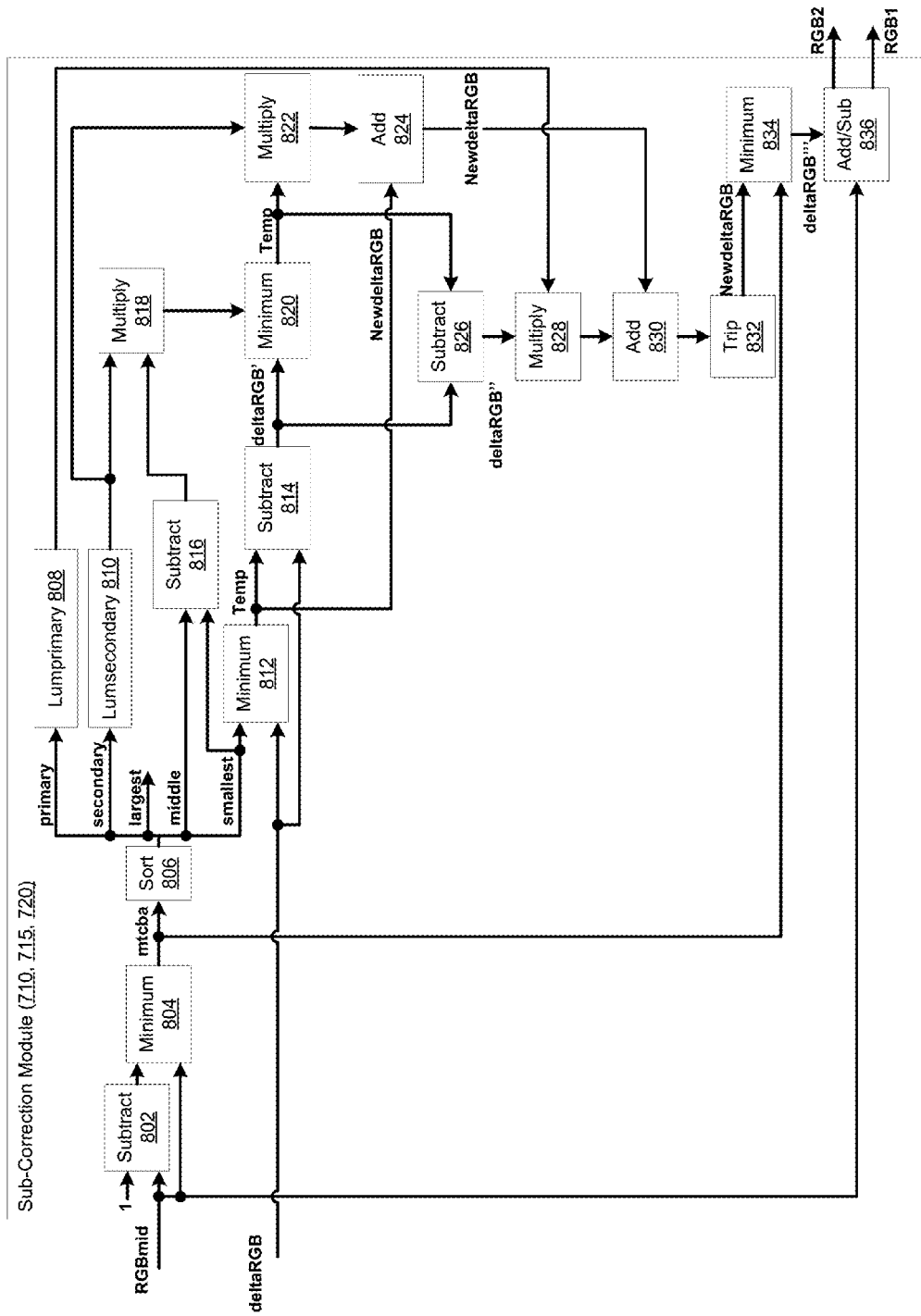
FIG. 8 illustrates a block diagram of another element of the decoder according to at least one example embodiment.

FIG. 8 illustrates a block diagram of a sub-correction module 710, 715, 720 of the decoder 630 according to at least one example embodiment. As shown in FIG. 8, the sub-correction module 710, 715, 720 includes a plurality of subtraction blocks 802, 814, 816, and 826, a plurality of minimum blocks 804, 812, 820, and 834, a plurality of add blocks 824 and 830, a plurality of multiply blocks 818, 822 and 828, a sort block 806, a lumprimary block 808, a lumsecondary block 810, a trip block 832, and an add/sub block 836.

The plurality of subtraction blocks 802, 814, 816, and 826 may be configured to calculate and output a difference between at least two input values. The plurality of minimum blocks 804, 812, 820, and 834 may be configured to calculate and output the minimum value of at least two values. The plurality of add blocks 824 and 830 may be configured to calculate and output a sum of at least two input values. The plurality of multiply blocks 818, 822 and 828 may be configured to multiply at least two input values with each other and output the result. The sort block 806 may be configured to order a plurality of input values from smallest value to largest value (or, alternatively, largest value to smallest value). The lumprimary block 808 may be configured to determine and/or calculate and output a lumen value (e.g., a Y) based on a smallest value of the maximum amount that can be added to a RGB. The lumsecondary block 810 may be configured to determine and/or calculate and output a lumen value (e.g., a Y) based on a largest value of the maximum amount that can be added to a RGB. The trip block 832 may be configured to calculate and/or determine output RGB values (e.g., associated with new Delta W 425) for adding to a pixel mid point in order to reposition a pixel within the RGB color space. The add/sub block 836 adds the output RGB values to the pixel mid point to calculate a position of a first pixel and subtracts the output RGB values from the pixel mid point to calculate a position of a second pixel. In an example implementation, the sub-correction module 710, 715, 720 may be configured to determine R, G and B for at pixels associated with a 2×2 block of pixels using the techniques describe above with regard to FIGS. 4A-4C.

According to an example implementations, the sub-correction module 710, 715, 720 receives as input a deltaRGB value and a RGBmid value and generates two RGB values RGB 1 and RGB2 representing the position of a first pixel and a second pixel in a RGB color space. As shown in FIG. 8, the RGBmid is subtracted from 1 (block 802) which is output to block 804 where a minimum of the RGBmid and the output from block 802 is determined. The minimum RGB values from block 804 are then sorted (block 806). The smallest value from block 806 is compared to deltaRGB (block 812) and the minimum value of the two is output and subtracted from deltaRGB (block 814) as deltaRGB'.

The smallest value from block 806 is subtracted from the middle value from block 806 (block 816) which is then multiplied by the Lumsecondary 810 (block 818). The output of block 818 is compared to deltaRGB' (block 820) and the minimum is output and multiplied by Lumsecondary 810 (block 822). The output is added to the output of block 812 (block 824) and set as a NewdeltaRGB.

The output of block 820 is subtracted from deltaRGB' (block 826) which is then multiplied by Lumprimary 808 (block 828). The output of block 828 is added to NewdeltaRGB (block 830) and the result is configured into a RGB from (block 832) and set as a NewdeltaRGB. The NewdeltaRGB is compared to the output of block 804 and a minimum of the two is selected (block 834) as a deltaRGB'''. DeltaRGB''' is added to and subtracted from RGBmid (block 836) to calculate a position of a first pixel and a position of a second pixel which are then output as RGB1 and RGB2. Listing 1 is a code snippet showing an example implementation of the sub-correction module 710, 715, 720.

% mtcba (max that can be added)
% this is calculated by determining how far from the wall is the midpoint Mtcba=max(0,min($rgbav$,(1−$rgbav$)));

% sort mtcba

Figure 9:
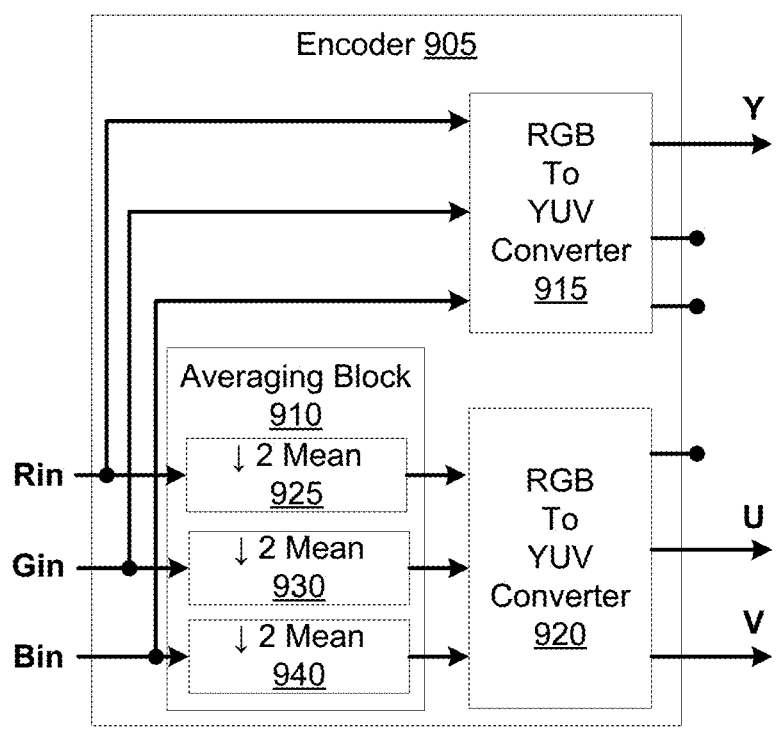
FIG. 9 illustrates a block diagram of an encoder according to at least one example embodiment.

[smallest,secondary]=min(mtcba,[ ],3);

[largest,primary]=max(mtcba,[ ],3);

middle=sum((mtcba,3)−largest−smallest;

% first calculate white temp=min(deltaRGB,smallest);

newdeltaRGB=temp;

deltaRGB=deltaRGB−temp;

% this is when it hits the first wall
% next calculate the secondary color temp=min(deltaRGB,(middle-smallest).*lumsecondary(secondary));

newdeltaRGB=newdeltaRGB+temp./lumsecondary(secondary);

deltaRGB=deltaRGB−temp;
% this is it hits the second wall
% finally calculate the primary color newdeltaRGB=newdeltaRGB+deltaRGB./lumprimary(primary);

deltaRGB=trip(s).*min(mtcba,trip(newdeltaRGB));

$rgb1$=$rgbav$+deltaRGB;

$tgb2$=$rgbav$−deltaRGB;

FIG. 9 illustrates a block diagram of an encoder 905 according to at least one example embodiment. As shown in FIG. 9, the encoder 905 includes an averaging block 910, a RGB to YUV converter 915 and a RGB to YUV converter

920. The averaging block 910 includes mean elements 925, 930 and 940. Although not shown, the encoder 905 may include other elements not shown. For example, the encoder could include a discrete cosine transform (DCT) module, a quantizer, an entropy encoder, a down sampler, and the like. Further, the encoder 905 may be communicatively coupled to other devices as part of a larger system. For example, the encoder may communicatively coupled a server or other device configured to transmit an encoded image to another device (e.g., computing device). The other device may or may not include a decoder (e.g., decoder 630) configured to decode an encoded image.

The RGB to YUV converters 915, 920 may be configured to convert a pixel, a block of pixels, an image, a portion of an image, and the like from a RGB color space (e.g., RGB color space 205) to a YUV color space (e.g., YUV color space 210). For example, the RGB to YUV converter 915, 920 may be configured to convert a pixel from a RGB color space to a YUV color space using equations 1-6. Accordingly, the RGB to YUV converter 915, 920 may be configured to receive an input Rin, Gin, and Bin and output Y, U and V based on the input Rin, Gin, and Bin and equations 1-6. In an example implementation, the input Rin, Gin, and Bin may be an N×N (e.g., 2×2, 2×4, 4×4, 16×16, and the like) block of pixels. Accordingly, the averaging block 910 may be configured to average each N×N block of pixels. As is shown in FIG. 9, the mean element 925 may be configured to average Rin associated with the N×N block of pixels, the mean element 930 may be configured to average Gin associated with the N×N block of pixels and the mean element 940 may be configured to average Bin associated with the N×N block of pixels. The mean element 925, 930, 940 may be further configured to down sample. In an example implementation, the mean element 925, 930, 940 may be configured to down sample prior to using a 2×2 box filter to generate an average R, G and B value. In other words, the mean element 925, 930, 940 may be configured to down sample a 2×2 block of pixels (four pixels) to two pixels that are the average of adjacent pixels or one pixel that is the average of four pixels.

As shown in FIG. 9, the RGB to YUV converter 915 receives an input Rin, Gin, and Bin and outputs Y based on the input Rin, Gin, and Bin and equations 1-6. The U and V values of the RGB to YUV converter 915 may not be used. Further, the RGB to YUV converter 920 receives an input down sampled and averaged Rin, Gin, and Bin values and outputs U and V based on the down sampled and averaged Rin, Gin, and Bin values and equations 1-6. The Y value of the RGB to YUV converter 920 may not be used.

The encoder 905 may then output an encoded N×N block of pixels in the YUV color space. An encoded image (in the YUV color space) may be generated based on a plurality of encoded N×N block of pixels. This image may be stored (e.g., as discussed above with regard to the datastore 120 or communicated to another device (e.g., to be displayed on a display of the device). Accordingly, the device may include decoder 630.

According to an example embodiment, a decoder can correct, reduce and/or eliminate (or substantially eliminate) a color artifact or distortion due to errors in or associated with gamma correction used in an encoder during a conversion of a pixel from a Luminance (or Luma)/Chrominance (YUV) color space to a Red/Green/Blue (RGB) color space. A color artifact or distortion due to errors in or associated with gamma correction used in an encoder can be referred to as "gamma averaging" and can appear as color shifts associated with a checkerboard in a decoded image. For example, referring to FIG. 13B, an image 1325 is a decoded image associated with an original image 1320. The image 1325 illustrates a color shift that, in an example implementation, can be corrected, reduced and/or eliminated (or substantially eliminated) during decoding. For example, image 1330 has been encoded and decoded using a linear space averaging technique according to an example embodiment.

Figure 10:
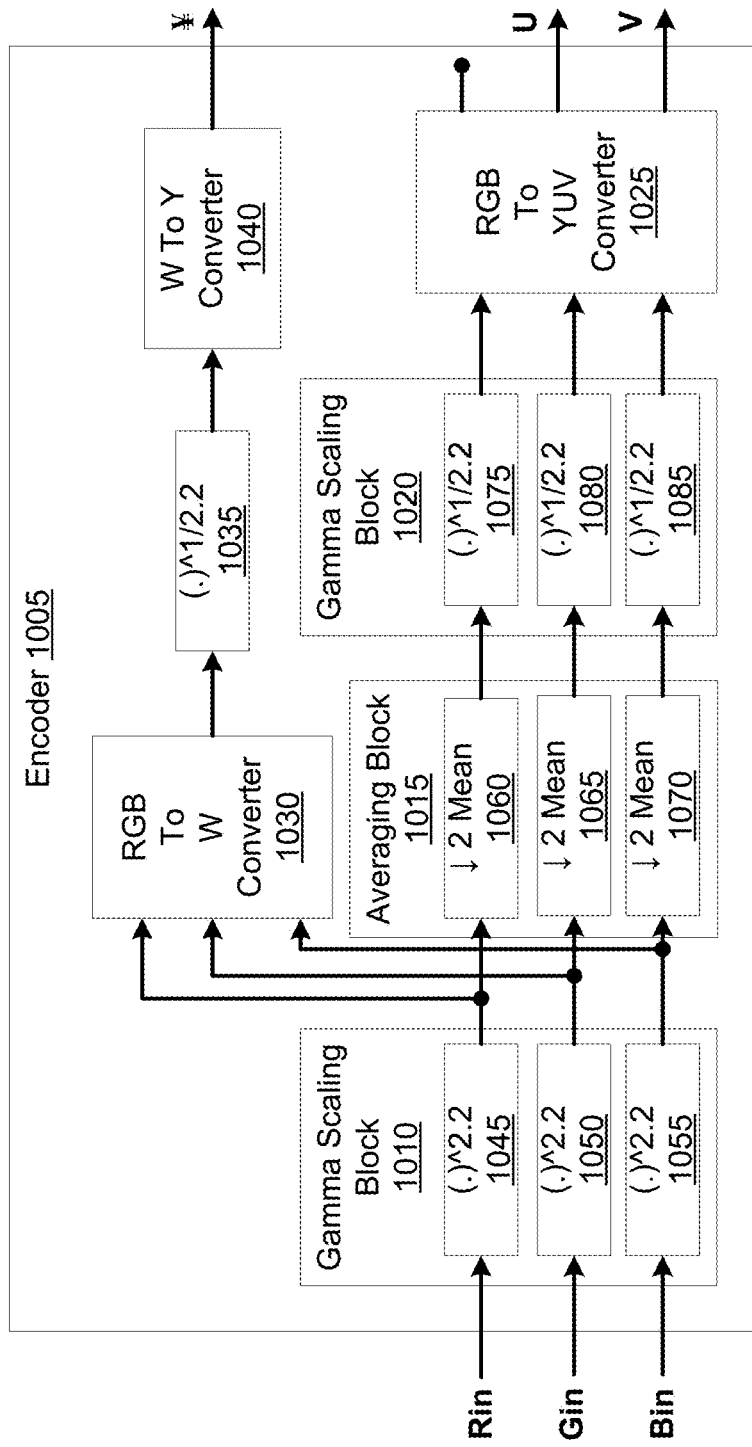
FIG. 10 illustrates a block diagram of another encoder according to at least one example embodiment.
Figure 14:
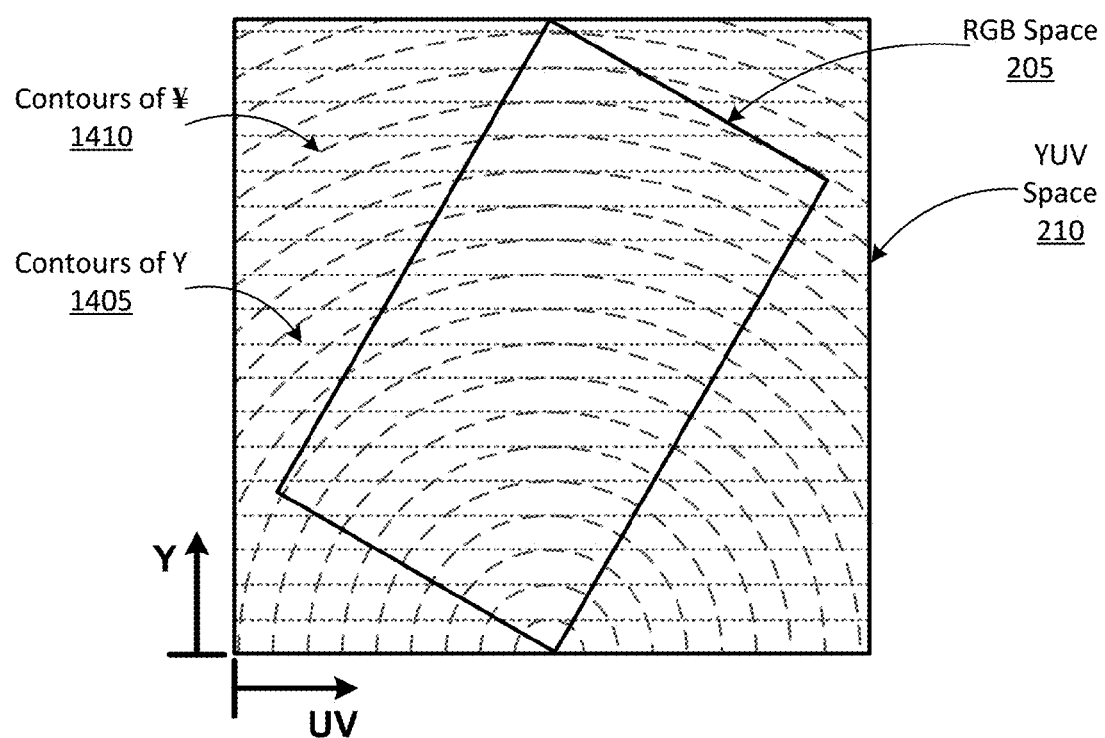
FIG. 14 illustrates a graphical representation of contours of Y and Ỳ in a YUV color space and a RGB color space according to at least one example embodiment.

FIG. 10 illustrates a block diagram of another encoder 1005 according to at least one example embodiment. The encoder 1005 includes a gamma scaling block 1010, an averaging block 1015, a gamma scaling block 1020, a RGB to YUV converter 1025, a RGB to W converter 1030, an exponent block 1035, and a W to Y converter 1040. As shown in FIG. 10, the encoder receives an input Rin, Gin, and Bin and outputs Ȳ, U and V based on the input Rin, Gin, and Bin. Y and Ȳ are not the same in that contours associated with equal Y values are straight lines (or linear) whereas contours associated with equal Ȳ values are curved (or non-linear). FIG. 14 illustrates example representations of a contour of Y 1405 and a contour of Ȳ 1410 on a graph of the YUV color space 210 and the RGB color space 205.

The gamma scaling block 1010, 1020 may be configured to scale (e.g., multiply, divide, raise to a fraction and/or raise to a power) the Rin, Gin, and Bin values. In the example implementations, Rin, Gin, and Bin may be scaled prior to conversion to the YUV color space. Therefore, Y (as well as U and V) can be calculated in the linear space and then later transmitted in the gamma space. Further, R, G and B can be averaged in the linear space. For example, as shown in FIG. 10, the gamma scaling block 1010 includes exponent blocks 1045, 1050 and 1055. The exponent blocks 1045, 1050, 1055 may be configured to (mathematically) raise the Rin, Gin, and Bin values to a power n (e.g., $p^n$). Herein after n will be referred to as gamma. In the example implementation, each of the exponent blocks 1045, 1050, 1055 raise the Rin, Gin, and Bin values to the same gamma. For example, each of the exponent blocks 1045, 1050, 1055 raise the Rin, Gin, and Bin values to the gamma equal to 2.2. However, other values of gamma are within the scope of this disclosure. Further, different values for gamma associated with Rin, Gin, and Bin, respectively, are within the scope of this disclosure.

The averaging block 1015 includes mean elements 1060, 1065 and 1070. In an example implementation, the input Rin, Gin, and Bin may be an N×N (e.g., 2×2, 2×4, 4×4, 16×16, and the like) block of pixels. Accordingly, the averaging block 1015 may be configured to average each N×N block of pixels. As is shown in FIG. 10, the mean element 1060 may be configured to average gamma scaled Rin associated with the N×N block of pixels, the mean element 1065 may be configured to average gamma scaled Gin associated with the N×N block of pixels and the mean element 1070 may be configured to average gamma scaled Bin associated with the N×N block of pixels. The mean element 1060, 1065, 1070 may be further configured to down sample. In an example implementation, the mean element 1060, 1065, 1070 may be configured to down sample prior to using a 2×2 box filter to generate an average R, G and B value. In other words, the mean element 1060, 1065, 1070 may be configured to down sample a 2×2 block of pixels (four pixels) to two pixels that are the average of adjacent pixels or one pixel that is the average of four pixels.

As shown in FIG. 10, the gamma scaling block 1020 includes exponent blocks 1075, 1080 and 1085. The exponent blocks 1075, 1080 and 1085 may be configured to (mathematically) raise the Rin, Gin, and Bin values to gamma. In the example implementation, each of the exponent blocks 1075, 1080 and 1085 raise the Rin, Gin, and Bin values to the same gamma. For example, each of the exponent blocks 1075, 1080 and 1085 raise the Rin, Gin, and Bin values to gamma equal to 1/2.2(also referred to as raising to a fraction). In the example implementation, exponent blocks 1075, 1080 and 1085 have a gamma that is the inverse of the gamma used in exponent blocks 1045, 1050, 1055. However, other values of gamma are within the scope of this disclosure. Further, different values for the gamma associated with Rin, Gin, and Bin, respectively, are within the scope of this disclosure.

The RGB to YUV converter 1025 may be configured to convert a pixel, a block of pixels, an image, a portion of an image, and the like from a RGB color space (e.g., RGB color space 205) to a YUV color space (e.g., YUV color space 210). For example, the RGB to YUV converter 1025 may be configured to convert a pixel from a RGB color space to a YUV color space using equations 1-6. Accordingly, the RGB to YUV converter 1025 may be configured to receive an input based on Rin, Gin, and Bin and output Y, U and V based on the input Rin, Gin, and Bin and equations 1-6. In the example implementation, the RGB to YUV converter 1025 receives an input scaled, down sampled, linear averaged and scaled Rin, Gin, and Bin values and outputs U and V based on the scaled, down sampled, linear averaged and scaled Rin, Gin, and Bin values and equations 1-6. The Y value of the RGB to YUV converter 1025 may not be used.

The RGB to W converter 1030 may be configured to convert RGB to W (e.g., a grayscale) using a grayscale conversion technique. For example, the RGB to W converter 1030 may be configured to convert RGB to W by eliminating hue and saturation information while retaining luminance information. Alternatively, and/or in addition to, the RGB to W converter 1030 may be configured to convert RGB to W by averaging RGB (e.g., W=(R+Gn+B)/3). Alternatively, and/or in addition to, the RGB to W converter 1030 may be configured to convert RGB to W by scaling RGB (e.g., W=0.2126× R+0.7152×G+0.0722×B). The output of the RGB to W converter 1030 is raised to a fraction by the exponent block 1035 and the result is converted to a Y value by the W to Y converter 1040. The exponent block 1035 is configured in a manner similar to exponent blocks 1075, 1080 and 1085.

The W to Y converter 1040 may be configured generate or calculate a value for Y from a value for W. In other words, the W to Y converter 1040 convert a value based on a scale or range associated with the range of W in the RGB color space [0, 255] to a value based on a scale or range associated with the range of Y in the YUV color space [16, 235]. The W to Y converter 1040 may be configured to at least one of scale or offset the value of W to convert W to Y. The value for Y output from the W to Y converter 1040 is indicated as a Ÿ because the value output from the W to Y converter 1040 does not linearly scale across a range of UV, but instead is non-linear. In other words Ÿ is in the gamma space and has a contour (or scales across) UV as shown in FIG. 14. Accordingly, Ÿ can be plurality of values associated with the encoded image in the gamma space. Therefore, Ÿ can be a plurality of values calculated as a linear average of values in a non-linear first color space (e.g., Ÿ as a special Y color space) that are calculated as a combination of values in a linear second color space (e.g., a RGB color space).

Figure 11:
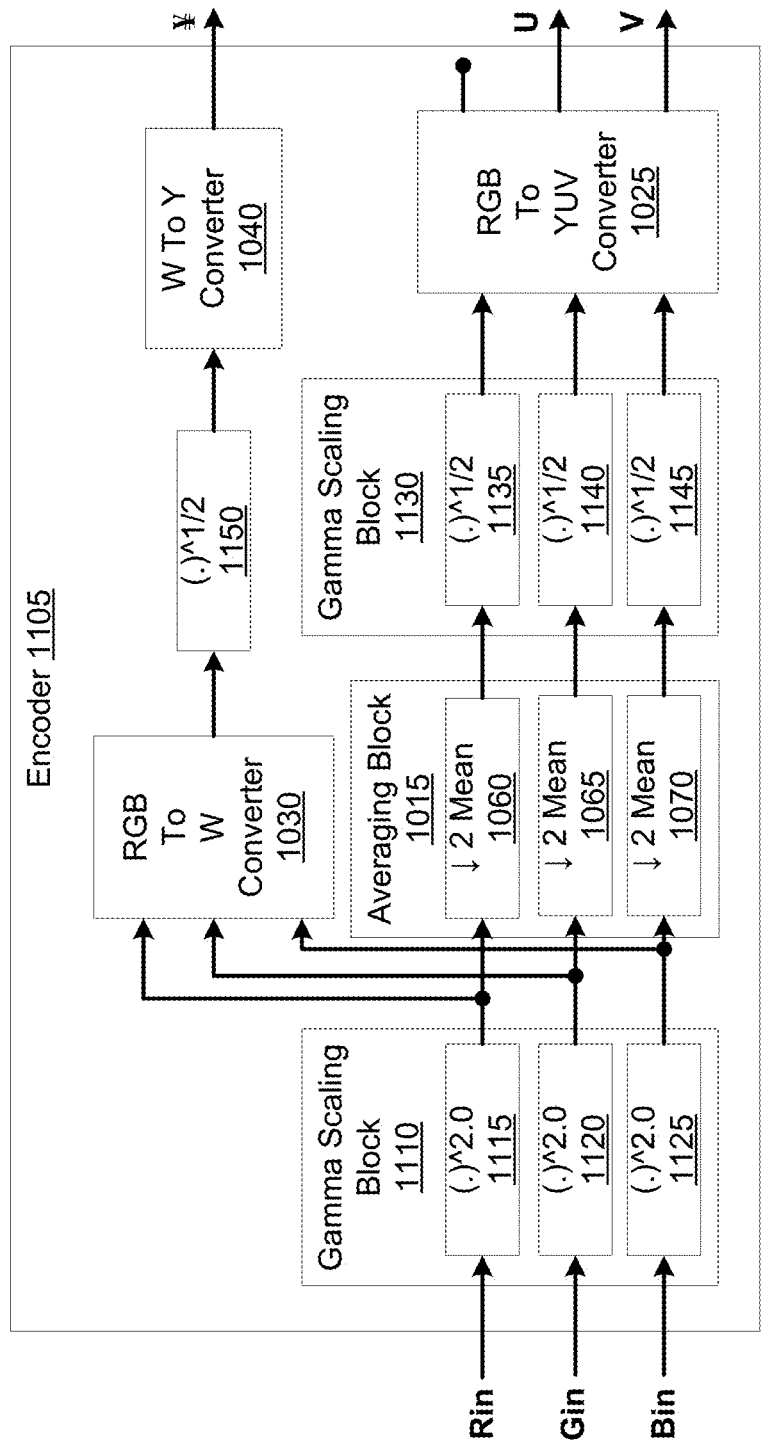
FIG. 11 illustrates a block diagram of yet another encoder according to at least one example embodiment.

FIG. 11 illustrates a block diagram of yet another encoder 1105 according to at least one example embodiment. The encoder 1105 is substantially similar to encoder 1005 described above with regard to FIG. 10. The exception being encoder 1105 includes a gamma scaling block 1110 including exponent blocks 1115, 1120 and 1125 each having gamma set to a value of 2.0. Further, encoder 1105 includes a gamma scaling block 1130 including exponent blocks 1135, 1140 and 1145 each having gamma set to a value of ½. And finally, encoder 1105 includes an exponent block 1150 having a gamma set to a value of ½.

According to the example implementations described above with regard to FIGS. 10 and 11, Y is calculated in the linear space and transmitted in the gamma space as Ÿ. U and V are determined by averaging RGB blocks in the linear space and converted to the gamma space followed by a YUV conversion where Y is not used. Further, the example implementation described above with regard to FIG. 11, a gamma is set to a value of 2.0, which may be beneficial in correcting for artifacts as discussed below with regard to FIG. 12.

Figure 12:
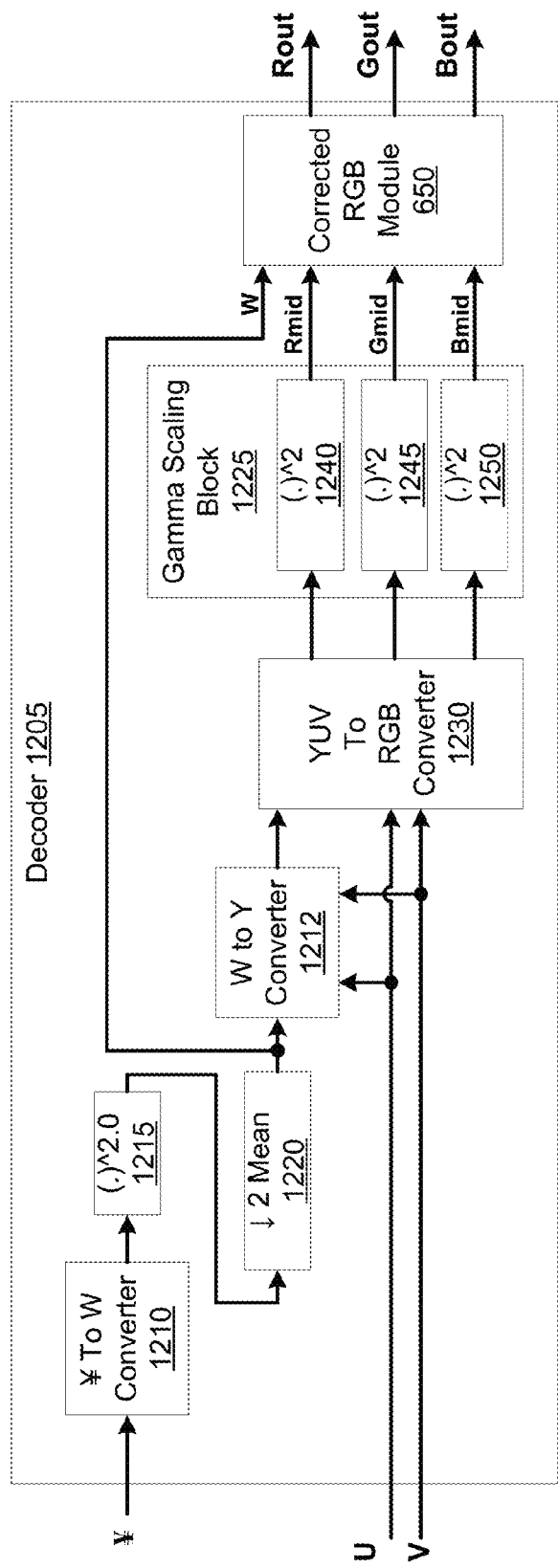
FIG. 12 illustrates a block diagram of an element of yet another decoder according to at least one example embodiment.

FIG. 12 illustrates a block diagram of yet another decoder 1205 according to at least one example embodiment. As shown in FIG. 12, the decoder 1205 includes a Ÿ to W converter 1210, an exponent block 1215, a mean element 1220, a gamma scaling block 1225, a YUV to RGB converter 1230 and the corrected RGB module 650 (or, alternatively, the corrected RGB module 650') each described in detail above.

As shown in FIG. 12, the decoder 1205 receives a Ÿ as a plurality of values associated with an encoded image. The plurality of values associated with Ÿ can be calculated as a linear average of values in a non-linear first color space (e.g., Ÿ as a special Y color space) that are calculated as a combination of values in a linear second color space (e.g., a RGB color space). The decoder 1205 receives U and V as two sets of pluralities of values associated with the encoded image. The two sets of pluralities of values may correspond to values in the non-linear first color space that are based on a spatially averaged combination of pixels in the linear second color space.

The Ÿ to W converter 1210 may be configured to convert a value of Ÿ from a value based on a scale or range associated with the range of Y in the YUV color space [16, 235] to a value based on a scale or range associated with the range of W in the RGB color space [0, 255]. The Ÿ to W converter 1210 may be configured to at least one of scale or offset the value of Y to convert Y to W.

The W to Y converter 1212 may be configured to convert a value of W to a Y value. For example, a Y value may be calculated based on a value of W using equations 10 and 11 below.

$$W_{corrected} = \sqrt{W_{in} - (auu + buv + cvv)} \quad (10)$$

Where
u=(U−128),
v=(V−128),
a=0.553983114241
b=0.373907338957, and
c=1.149601072847.

$$Y = \frac{255 \times W_{corrected}}{219} + 16 \quad (11)$$

The exponent block 1215 is configured to operate substantially similar to the exponent blocks 1045, 1050, 1055 with the exception that the exponent block 1215 has a gamma set to 2.0. The mean element 1220 may be configured to average gamma scaled W. The mean element 1220 may be configured to down sample prior to using a 2×2 box filter to generate an average W value. In other words, the mean element 1220 may be configured to down sample a 2×2 block of pixels (four pixels) to two pixels that are the average of adjacent pixels or one pixel that is the average of four pixels. Together, the Ÿ to W converter 1210, the W to Y converter 1212, the exponent block 1215 and the mean element 1220 blocks may be configured to convert the plurality of values associated with $\bar{Y}$ to a plurality of values in the non-linear first color space (e.g., Y color space) based on the plurality of values associated with $\bar{Y}$, the plurality of values associated with U and the plurality of values associated with V.

The YUV to RGB converter 1230 receives as input the U and V (as input to the decoder 1205) and a gamma scaled (or corrected) average Y (converted from $\bar{Y}$) as output from the mean element 1220. The YUV to RGB converter 1230 may be configured to calculate R, G and B based on Y, U and V using equations 7-9 as well as the quadratic function (eqn. 10 below) and output R, G and B to the gamma scaling block 1225.

The example embodiment discussed with regard to FIGS. 10-12 may be configured to correct, reduce and/or eliminate (or substantially eliminate) a color artifact or distortion due to errors associated with clipping as well as errors associated with gamma correction used in an encoder during a conversion of a pixel from a Luminance (or Luma)/Chrominance (YUV) color space to a Red/Green/Blue (RGB) color space (also referred to as gamma averaging). Further, the example embodiment discussed with regard to FIGS. 10-12 may include the implementation described in association with FIG. 7B. Accordingly, example embodiments may be configured to correct, reduce and/or eliminate (or substantially eliminate) at least one color artifact or distortion due to errors associated with clipping, an encoder interpolation filter (e.g., blocking) and encoder gamma correction.

Figure 15:
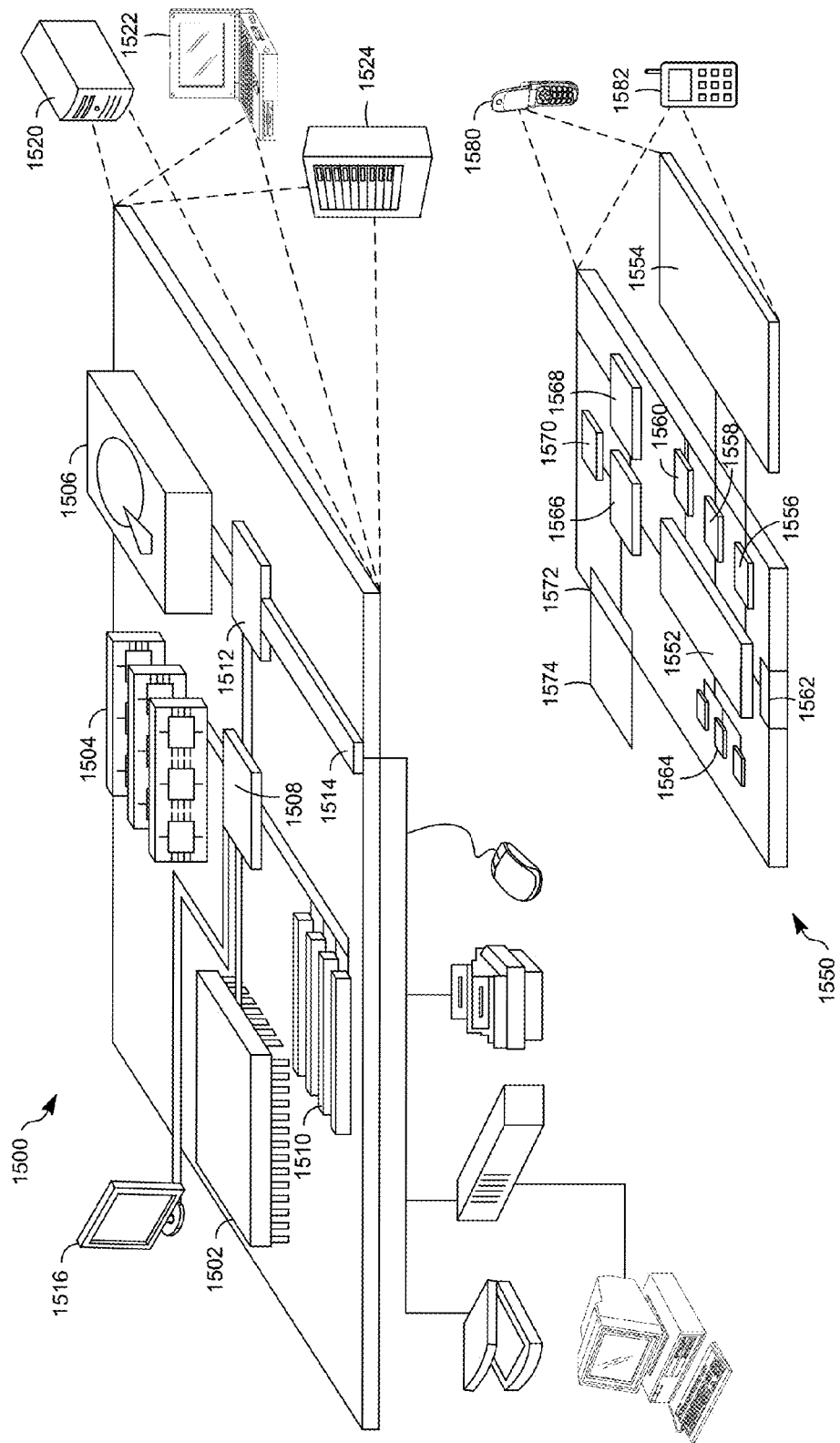
FIG. 15 illustrates an example of a computer device and a mobile computer device that can be used to implement the techniques described here.

FIG. 15 shows an example of a generic computer device 1500 and a generic mobile computer device 1550, which may be used with the techniques described here. For example, any of the aforementioned encoding and/or decoding techniques described herein may be implemented on one or both of the generic computer device 1500 and the generic mobile computer device 1550. Computing device 1500 is intended to represent various forms of digital computers, such as laptops, desktops, workstations, personal digital assistants, servers, blade servers, mainframes, and other appropriate computers. Computing device 1550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1500 includes a processor 1502, memory 1504, a storage device 1506, a high-speed interface 1508 connecting to memory 1504 and high-speed expansion ports 1510, and a low speed interface 1512 connecting to low speed bus 1514 and storage device 1506. Each of the components 1502, 1504, 1506, 1508, 1510, and 1512, are interconnected using various busses, and may be mounted on a common motherboard or in other manners as appropriate. The processor 1502 can process instructions for execution within the computing device 1500, including instructions stored in the memory 1504 or on the storage device 1506 to display graphical information for a GUI on an external input/output device, such as display 1516 coupled to high speed interface 1508. In other implementations, multiple processors and/or multiple buses may be used, as appropriate, along with multiple memories and types of memory. Also, multiple computing devices 1500 may be connected, with each device providing portions of the necessary operations (e.g., as a server bank, a group of blade servers, or a multi-processor system).

The memory 1504 stores information within the computing device 1500. In one implementation, the memory 1504 is a volatile memory unit or units. In another implementation, the memory 1504 is a non-volatile memory unit or units. The memory 1504 may also be another form of computer-readable medium, such as a magnetic or optical disk.

The storage device 1506 is capable of providing mass storage for the computing device 1500. In one implementation, the storage device 1506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1504, the storage device 1506, or memory on processor 1502.

The high speed controller 1508 manages bandwidth-intensive operations for the computing device 1500, while the low speed controller 1512 manages lower bandwidth-intensive operations. Such allocation of functions is exemplary only. In one implementation, the high-speed controller 1508 is coupled to memory 1504, display 1516 (e.g., through a graphics processor or accelerator), and to high-speed expansion ports 1510, which may accept various expansion cards (not shown). In the implementation, low-speed controller 1512 is coupled to storage device 1506 and low-speed expansion port 1514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1500 may be implemented in a number of different forms, as shown in the figure. For example, it may be implemented as a standard server 1520, or multiple times in a group of such servers. It may also be implemented as part of a rack server system 1524. In addition, it may be implemented in a personal computer such as a laptop computer 1522. Alternatively, components from computing device 1500 may be combined with other components in a mobile device (not shown), such as device 1550. Each of such devices may contain one or more of computing device 1500, 1550, and an entire system may be made up of multiple computing devices 1500, 1550 communicating with each other.

Computing device 1550 includes a processor 1552, memory 1564, an input/output device such as a display 1554, a communication interface 1566, and a transceiver 1568, among other components. The device 1550 may also be provided with a storage device, such as a microdrive or other device, to provide additional storage. Each of the components 1550, 1552, 1564, 1554, 1566, and 1568, are interconnected using various buses, and several of the components may be mounted on a common motherboard or in other manners as appropriate.

The processor 1552 can execute instructions within the computing device 1550, including instructions stored in the memory 1564. The processor may be implemented as a chipset of chips that include separate and multiple analog and digital processors. The processor may provide, for example, for coordination of the other components of the device 1550, such as control of user interfaces, applications run by device 1550, and wireless communication by device 1550.

Processor 1552 may communicate with a user through control interface 1558 and display interface 1556 coupled to a display 1554. The display 1554 may be, for example, a TFT LCD (Thin-Film-Transistor Liquid Crystal Display) or an OLED (Organic Light Emitting Diode) display, or other appropriate display technology. The display interface 1556 may comprise appropriate circuitry for driving the display 1554 to present graphical and other information to a user. The control interface 1558 may receive commands from a user and convert them for submission to the processor 1552. In addition, an external interface 1562 may be provide in communication with processor 1552, so as to enable near area communication of device 1550 with other devices. External interface 1562 may provide, for example, for wired communication in some implementations, or for wireless communication in other implementations, and multiple interfaces may also be used.

The memory 1564 stores information within the computing device 1550. The memory 1564 can be implemented as one or more of a computer-readable medium or media, a volatile memory unit or units, or a non-volatile memory unit or units. Expansion memory 1574 may also be provided and connected to device 1550 through expansion interface 1572, which may include, for example, a SIMM (Single In Line Memory Module) card interface. Such expansion memory 1574 may provide extra storage space for device 1550, or may also store applications or other information for device 1550. Specifically, expansion memory 1574 may include instructions to carry out or supplement the processes described above, and may include secure information also. Thus, for example, expansion memory 1574 may be provide as a security module for device 1550, and may be programmed with instructions that permit secure use of device 1550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1564, expansion memory 1574, or memory on processor 1552, that may be received, for example, over transceiver 1568 or external interface 1562.

Device 1550 may communicate wirelessly through communication interface 1566, which may include digital signal processing circuitry where necessary. Communication interface 1566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1568. In addition, short-range communication may occur, such as using a Bluetooth, WiFi, or other such transceiver (not shown). In addition, GPS (Global Positioning System) receiver module 1570 may provide additional navigation- and location-related wireless data to device 1550, which may be used as appropriate by applications running on device 1550.

Device 1550 may also communicate audibly using audio codec 1560, which may receive spoken information from a user and convert it to usable digital information. Audio codec 1560 may likewise generate audible sound for a user, such as through a speaker, e.g., in a handset of device 1550. Such sound may include sound from voice telephone calls, may include recorded sound (e.g., voice messages, music files, etc.) and may also include sound generated by applications operating on device 1550.

The computing device 1550 may be implemented in a number of different forms, as shown in the figure. For example, it may be implemented as a cellular telephone 1580. It may also be implemented as part of a smart phone 1582, personal digital assistant, or other similar mobile device.

The techniques described herein may be implemented in a computer device and/or a mobile computer device. Computing devices may include various forms of digital computers, such as laptops, desktops, workstations, personal digital assistants, servers, blade servers, mainframes, and other appropriate computers. A mobile computer device may include various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A memory may store information within the computing device or the mobile computer device. In one implementation, the memory is a volatile memory unit or units. In another implementation, the memory is a non-volatile memory unit or units. The memory may also be another form of computer-readable medium, such as a magnetic or optical disk.

A computer program product can be embodied in non-transitory computer readable medium (or memory). The computer program product may also contain instructions that, when executed, perform one or more methods, such as those described above. The computer readable medium can be a memory, a storage device, or memory on a processor. The processor may be formed on a silicon substrate, a GaAs substrate, and the like. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Partitions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A computer implemented method comprising:
   positioning, by a processor of the computer, a first pixel and a second pixel at a midpoint of the first pixel and the second pixel, the midpoint being associated with two colors of a first color space;
   repositioning, by the processor, the first pixel to a first position, the first position being on a boundary of a second color space and having a value, in the second color space, corresponding to a third color of the first color space; and
   repositioning, by the processor, the second pixel to a second position, the second position being rotationally symmetric with the repositioned first pixel around the midpoint.

2. The method of claim 1, wherein the first color space is a YUV color space and the second color space is a RGB color space.

3. The method of claim 1, wherein the midpoint corresponds to an encoded pixel associated with the first pixel and the second pixel.

4. The method of claim 1, wherein the repositioning of the first pixel includes:
   determining a first maximum value that can be added to a value for a first color of the colors of the second color space;
   determining a second maximum value that can be added to a value for a second color of the colors of the second color space;

determining a third maximum value that can be added to a value for a third color of the colors of the second color space;

determining a first value, a second value and a third value based on the first maximum value, the second maximum value, the third maximum value and a boundary value of the second color space; and repositioning the first pixel by adding the first value, the second value and the third value to a respective value for each of the colors of the first pixel.

5. The method of claim 1, wherein the repositioning of the first pixel includes:

determining a first maximum value that can be added to a value for a first color of the colors of the second color space;

determining a second maximum value that can be added to a value for a second color of the colors of the second color space;

determining a third maximum value that can be added to a value for a third color of the colors of the second color space;

setting a delta value to the smallest value of the first maximum value, the second maximum value, the third maximum value;

first recalculating the delta value based on the middle value of the first maximum value, the second maximum value, the third maximum value and a boundary value of the second color space;

second recalculating the delta value based on the largest value of the first maximum value, the second maximum value, the third maximum value and a boundary value of the second color space; and repositioning the first pixel by adding the delta value to a value of the first pixel.

6. The method of claim 1, further comprising:

generating an image based on a first plurality of pixels including the first pixel and the second pixel;

generating a second plurality of pixels by shifting each of the first plurality of pixels diagonally by one pixel;

generating a plurality of midpoint pixels based on adjacent pixels of the second plurality of pixels;

for each of the plurality of midpoint pixels:

positioning a third pixel and a fourth pixel at a corresponding midpoint pixel of the plurality of midpoint pixels, repositioning the third pixel to a third position, the third position being on a boundary of the second color space and having a value, in the second color space, corresponding to the third color of the first color space, and repositioning the fourth pixel to a fourth position, the fourth position being rotationally symmetric with the repositioned third pixel around the corresponding midpoint pixel;

generating a third plurality of pixels including each of the third pixel and the fourth pixel associated with the plurality of midpoint pixels; and generating an image by pixel by pixel averaging first plurality of pixels and the third plurality of pixels.

7. The method of claim 1, wherein the encoded image is one of:

received from a server including a first encoder, or received from a datastore including at least one image encoded by at least one second encoder.

8. The method of claim 1, further comprising:

generating a plurality of 2×2 blocks of pixels based on the encoded image, wherein each pixel of a 2×2 block of the plurality of 2×2 blocks of pixels is an averaged down sampled pixel, and the midpoint corresponds to a pixel of the 2×2 block.

9. A decoder comprising:

a corrected RGB processor configured to:

position a first pixel and a second pixel at a midpoint of the first pixel and the second pixel, the midpoint being associated with two colors of a first color space;

reposition the first pixel to a first position, the first position being on a boundary of a second color space and having a value, in the second color space, corresponding to a third color of the first color space; and reposition the second pixel to a second position, the second position being rotationally symmetric with the repositioned first pixel around the midpoint.

10. The decoder of claim 9, wherein the first color space is a YUV color space and the second color space is a RGB color space.

11. The decoder of claim 9, wherein the midpoint corresponds to an encoded pixel associated with the first pixel and the second pixel.

12. The decoder of claim 9, wherein during the repositioning of the first pixel corrected RGB processor is further configured to:

determine a first maximum value that can be added to a value for a first color of the colors of the second color space;

determine a second maximum value that can be added to a value for a second color of the colors of the second color space;

determine a third maximum value that can be added to a value for a third color of the colors of the second color space;

determine a first value, a second value and a third value based on the first maximum value, the second maximum value, the third maximum value and a boundary value of the second color space; and reposition the first pixel by adding the first value, the second value and the third value to a respective value for each of the colors of the first pixel.

13. The decoder of claim 9, wherein during the repositioning of the first pixel corrected RGB processor is further configured to:

determine a first maximum value that can be added to a value for a first color of the colors of the second color space;

determine a second maximum value that can be added to a value for a second color of the colors of the second color space;

determine a third maximum value that can be added to a value for a third color of the colors of the second color space;

set a delta value to the smallest value of the first maximum value, the second maximum value, the third maximum value;

first recalculate the delta value based on the middle value of the first maximum value, the second maximum value, the third maximum value and a boundary value of the second color space;

second recalculate the delta value based on the largest value of the first maximum value, the second maximum value, the third maximum value and a boundary value of the second color space; and reposition the first pixel by adding the delta value to a value of the first pixel.

14. The decoder of claim 9, wherein the corrected RGB processor is further configured to:
- generate an image based on a first plurality of pixels including the first pixel and the second pixel;
- generate a second plurality of pixels by shifting each of the first plurality of pixels diagonally by one pixel;
- to generate a plurality of midpoint pixels based on adjacent pixels of the second plurality of pixels;
- for each of the plurality of midpoint pixels:
  - position a third pixel and a fourth pixel at a corresponding midpoint pixel of the plurality of midpoint pixels,
  - reposition the third pixel to a third position, the third position being on a boundary of the second color space and having a value, in the second color space, corresponding to the third color of the first color space, and
  - reposition the fourth pixel to a fourth position, the fourth position being rotationally symmetric with the repositioned third pixel around the corresponding midpoint pixel;
- generate a third plurality of pixels including each of the third pixel and the fourth pixel associated with the plurality of midpoint pixels; and
- generate an image by pixel by pixel averaging first plurality of pixels and the third plurality of pixels.

15. The decoder of claim 9, wherein the encoded image is one of:
- received from a server including a first encoder, or
- received from a datastore including at least one image encoded by at least one second encoder.

16. The decoder of claim 9, wherein the decoder is configured to:
- generate a plurality of 2×2 blocks of pixels based on the encoded image, wherein
- each pixel of a 2×2 block of the plurality of 2×2 blocks of pixels is an averaged down sampled pixel, and
- the midpoint corresponds to a pixel of the 2×2 block.

17. A computer implemented method comprising:
- receiving, by a processor of the computer, a first plurality of values associated with the encoded image, the first plurality of values are calculated as a linear average of values in a non-linear first color space calculated as a combination of values in a linear second color space;
- receiving, by the processor, a second plurality of values associated with the encoded image;
- receiving, by the processor, a third plurality of values associated with the encoded image, the second plurality of values and the third plurality of values correspond to values in the non-linear first color space that are based on a spatially averaged combination of pixels in the linear second color space;
- converting, by the processor, the first plurality of values to a fourth plurality of values in the non-linear first color space based on the first plurality of values, the second plurality of values and the third plurality of values; and
- generating, by the processor, a plurality of corrected pixels in the linear second color space based on the fourth plurality of values, the second plurality of values and the third plurality of values.

18. The method of claim 17, wherein generating the plurality of corrected pixels includes:
- positioning a first pixel and a second pixel at a midpoint of the first pixel and the second pixel, the midpoint being associated with two colors of a first color space;
- repositioning the first pixel to a first position, the first position being on a boundary of a second color space and having a value, in the second color space, corresponding to a third color of the first color space; and
- repositioning the second pixel to a second position, the second position being rotationally symmetric with the repositioned first pixel around the midpoint.

19. The method of claim 17, wherein the encoded image is one of:
- received from a server including a first encoder, or
- received from a datastore including at least one image encoded by at least one second encoder.

20. The method of claim 17, wherein generating the plurality of corrected pixels includes:
- generating an image based on a first plurality of pixels including the first pixel and the second pixel;
- generating a second plurality of pixels by shifting each of the first plurality of pixels diagonally by one pixel;
- generate a plurality of midpoint pixels based on adjacent pixels of the second plurality of pixels;
- for each of the plurality of midpoint pixels:
  - positioning a third pixel and a fourth pixel at a corresponding midpoint pixel of the plurality of midpoint pixels,
  - reposition the third pixel to a third position, the third position being on a boundary of the second color space and having a value, in the second color space, corresponding to the third color of the first color space, and
  - repositioning the fourth pixel to a fourth position, the fourth position being rotationally symmetric with the repositioned third pixel around the corresponding midpoint pixel;
- generating a third plurality of pixels including each of the third pixel and the fourth pixel associated with the plurality of midpoint pixels; and
- generating an image by pixel by pixel averaging first plurality of pixels and the third plurality of pixels.

* * * * *